US012572211B2

(12) United States Patent
Cui

(10) Patent No.: US 12,572,211 B2
(45) Date of Patent: Mar. 10, 2026

(54) VIRTUAL REALITY INTERACTION

(71) Applicant: Tencent Technology (Shenzhen) Company Limited, Shenzhen (CN)

(72) Inventor: Lan Cui, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 18/900,575

(22) Filed: Sep. 27, 2024

(65) Prior Publication Data

US 2025/0021164 A1 Jan. 16, 2025

Related U.S. Application Data

(63) Continuation of application No. PCT/CN2023/078921, filed on Mar. 1, 2023.

(30) Foreign Application Priority Data

Jun. 21, 2022 (CN) .......................... 202210705942.4

(51) Int. Cl.
*G06F 3/01* (2006.01)
*A63F 13/285* (2014.01)
*A63F 13/577* (2014.01)

(52) U.S. Cl.
CPC ............ *G06F 3/016* (2013.01); *A63F 13/285* (2014.09); *A63F 13/577* (2014.09); *G06F 3/014* (2013.01); *A63F 2300/8082* (2013.01)

(58) Field of Classification Search
CPC .......... G06F 3/016; G06F 3/014; G06F 3/011; G06F 3/017; G06F 3/01; G06F 3/0346; A63F 13/285; A63F 13/577; A63F 2300/8082; A63F 13/42
See application file for complete search history.

(56) References Cited

U.S. PATENT DOCUMENTS 10,024,679 B2 * 7/2018 Moore ..................... A61H 3/06
10,409,375 B1 * 9/2019 Higgins ................. G06F 3/016
10,642,356 B1 * 5/2020 Wang ..................... G06F 3/014
(Continued)

FOREIGN PATENT DOCUMENTS

CN 106227339 A 12/2016
CN 106681490 A 5/2017
(Continued)

OTHER PUBLICATIONS

International Search Report and Written Opinion received for PCT Patent Application No. PCT/CN2023/078921, mailed on Jun. 14, 2023, 13 pages (6 pages of English Translation and 7 pages of Original Document).

*Primary Examiner* — Ibrahim A Khan
(74) *Attorney, Agent, or Firm* — ARENTFOX SCHIFF LLP

(57) ABSTRACT

In a method for virtual reality (VR) interaction, a plurality of virtual objects in a VR environment is displayed. The plurality of virtual objects includes at least a first virtual object controlled by a first user and a second virtual object controlled by a second user. In response to an interaction initiated by the first virtual object towards the second virtual object, haptic feedback is triggered through a VR device worn by the second user. Apparatus and non-transitory computer-readable storage medium counterpart embodiments are also contemplated.

20 Claims, 19 Drawing Sheets

(56) References Cited

U.S. PATENT DOCUMENTS

| | | | |
|---|---|---|---|
| 10,732,721 B1* | 8/2020 | Clements | B66B 1/468 |
| 10,824,390 B1* | 11/2020 | Khaleghimeybodi | G02B 27/017 |
| 10,852,814 B1* | 12/2020 | Caron | G06T 19/006 |
| 10,852,839 B1* | 12/2020 | Ravasz | G06F 3/017 |
| 11,030,806 B2* | 6/2021 | Bretschneider | A63F 13/69 |
| 11,132,058 B1* | 9/2021 | Gupta | G06F 3/017 |
| 11,334,165 B1* | 5/2022 | Clements | B66B 1/468 |
| 11,347,312 B1* | 5/2022 | Wang | G06F 3/016 |
| 11,416,065 B1* | 8/2022 | Chan | G06F 3/011 |
| 12,061,680 B1* | 8/2024 | Hafeneger | G06F 21/32 |
| 12,327,624 B2* | 6/2025 | Aragones | G16H 20/60 |
| 2013/0162632 A1* | 6/2013 | Varga | H04N 13/383 345/419 |
| 2014/0266646 A1* | 9/2014 | Urbach | G06F 3/011 340/407.1 |
| 2014/0306891 A1* | 10/2014 | Latta | G02B 27/017 345/158 |
| 2015/0293592 A1* | 10/2015 | Cheong | G06F 1/163 345/173 |
| 2015/0331483 A1* | 11/2015 | Cieszkowski, III | G06F 3/011 345/156 |
| 2016/0166930 A1* | 6/2016 | Brav | G08B 21/02 463/30 |
| 2016/0274662 A1* | 9/2016 | Rimon | G06F 3/16 |
| 2017/0038829 A1* | 2/2017 | Lanier | G06T 19/006 |
| 2017/0169695 A1* | 6/2017 | Poisner | A63F 13/46 |
| 2018/0174347 A1* | 6/2018 | Chaney | G09G 5/377 |
| 2019/0111338 A1* | 4/2019 | Nakata | G06V 40/20 |
| 2022/0191157 A1* | 6/2022 | Lee | H04L 51/063 |
| 2022/0269346 A1* | 8/2022 | Hussami | G06F 3/02 |
| 2024/0372922 A1* | 11/2024 | Dasher | H04L 67/56 |

FOREIGN PATENT DOCUMENTS

| | | |
|---|---|---|
| CN | 106873775 A | 6/2017 |
| CN | 107636605 A | 1/2018 |
| CN | 108073285 A | 5/2018 |
| CN | 112203114 A | 1/2021 |
| CN | 113946211 A | 1/2022 |

* cited by examiner

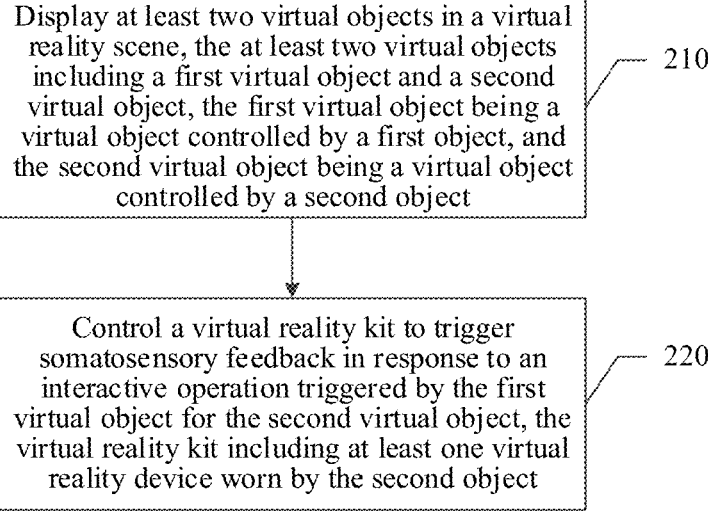

Display at least two virtual objects in a virtual reality scene, the at least two virtual objects including a first virtual object and a second virtual object, the first virtual object being a virtual object controlled by a first object, and the second virtual object being a virtual object controlled by a second object — 210

Control a virtual reality kit to trigger somatosensory feedback in response to an interactive operation triggered by the first virtual object for the second virtual object, the virtual reality kit including at least one virtual reality device worn by the second object — 220

Second virtual object

First virtual object

First object

Second object

B1

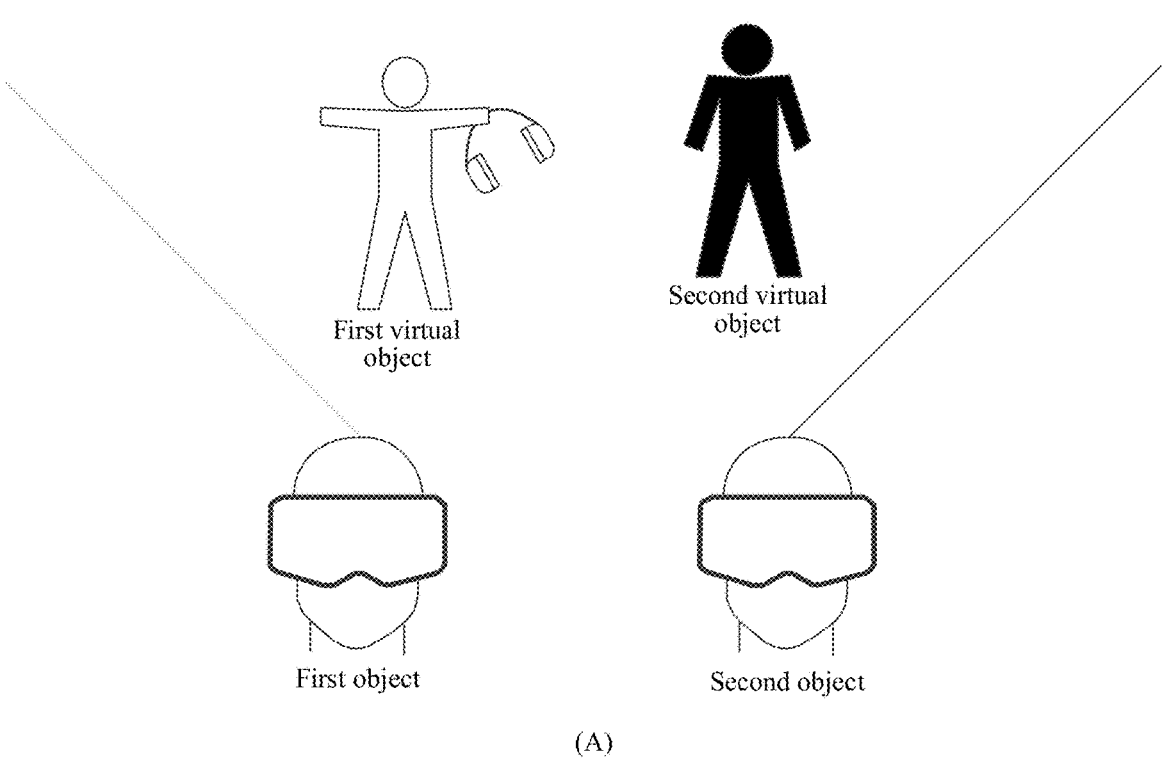
(A)
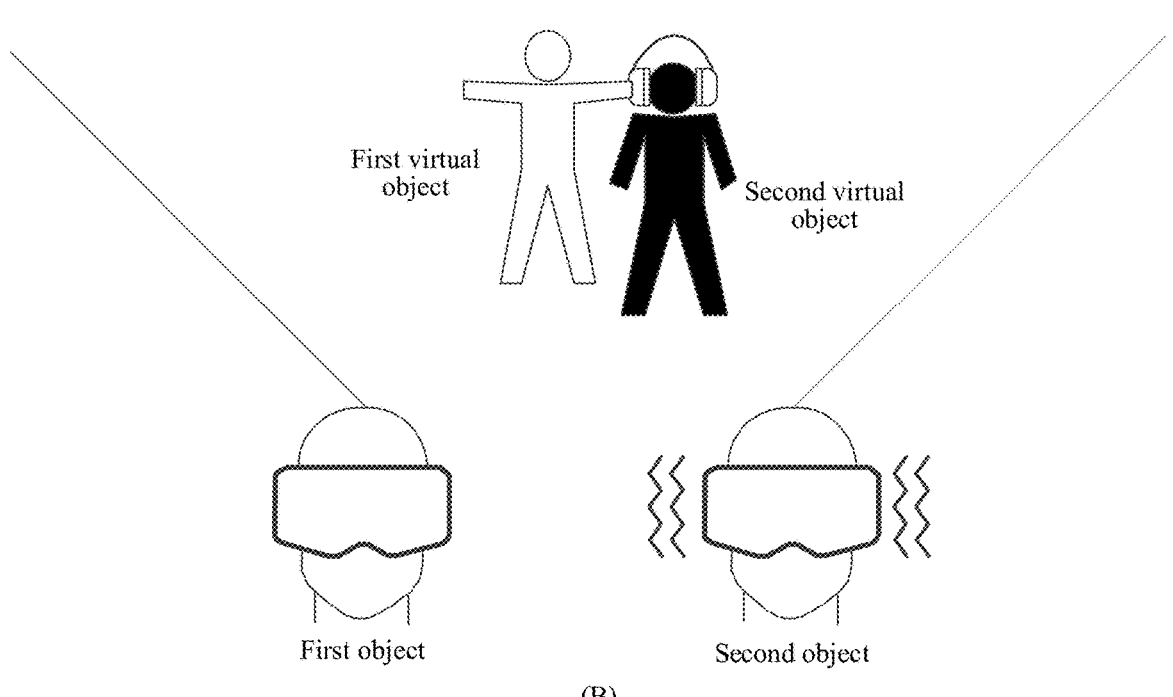
(B)
FIG. 17

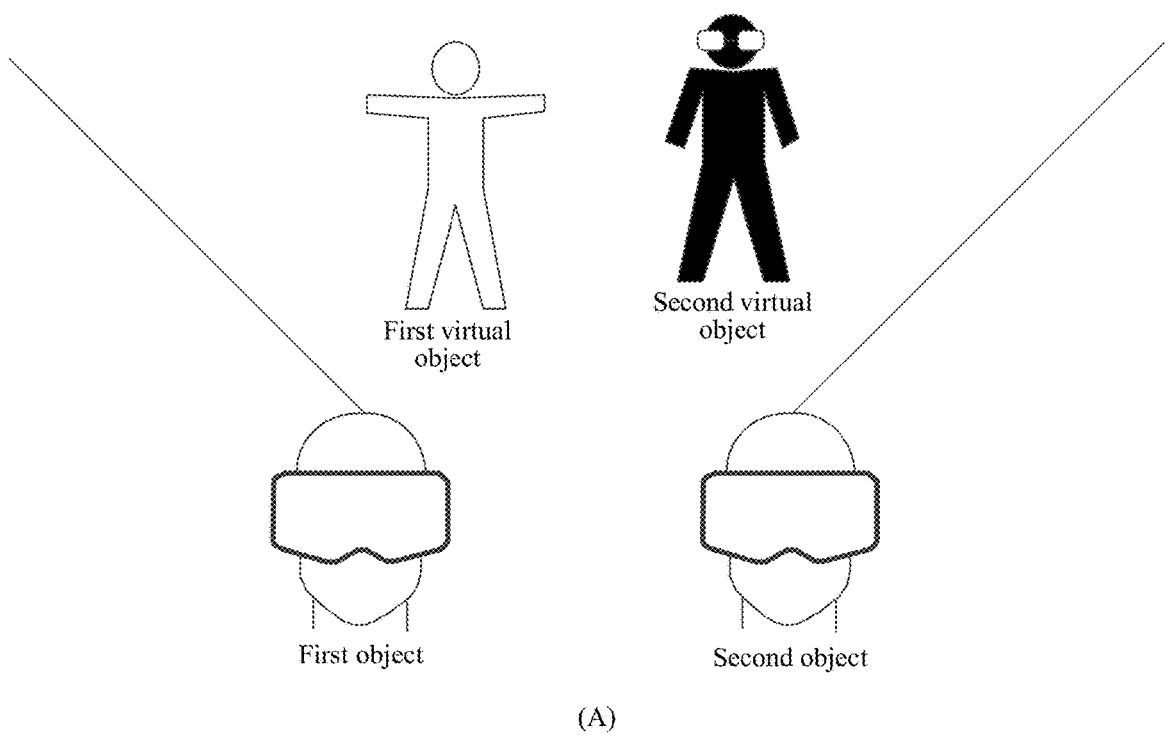
(A)
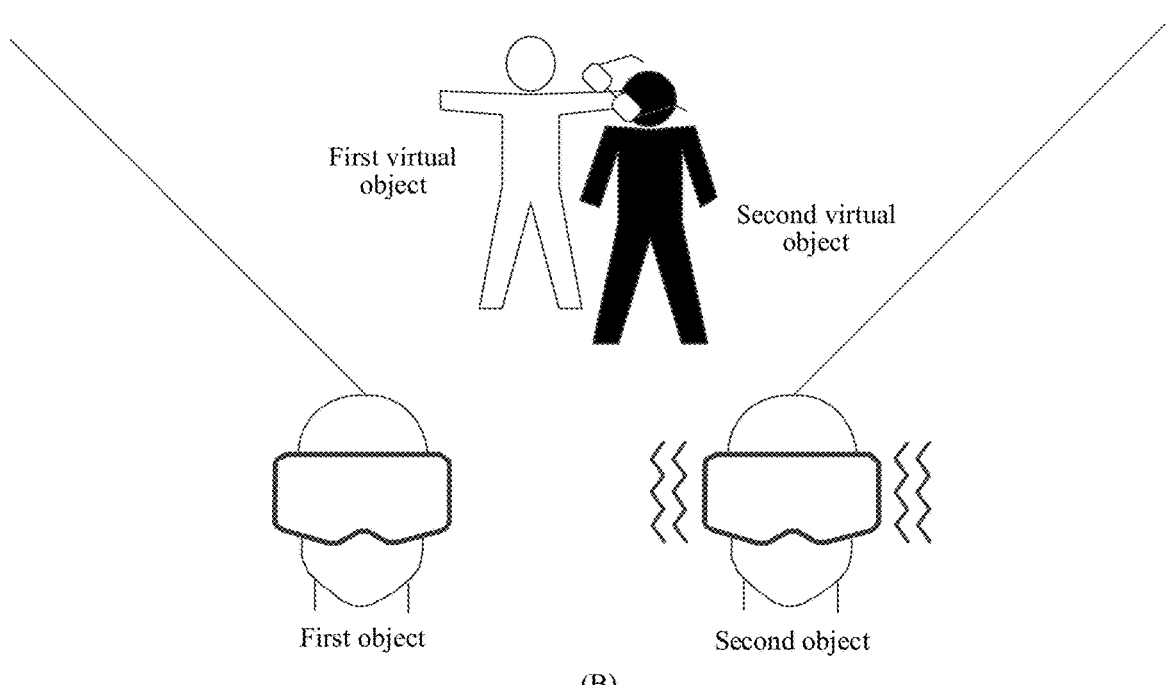
(B)
FIG. 18

C1

C1

First virtual object

Second virtual object

First object

Second object

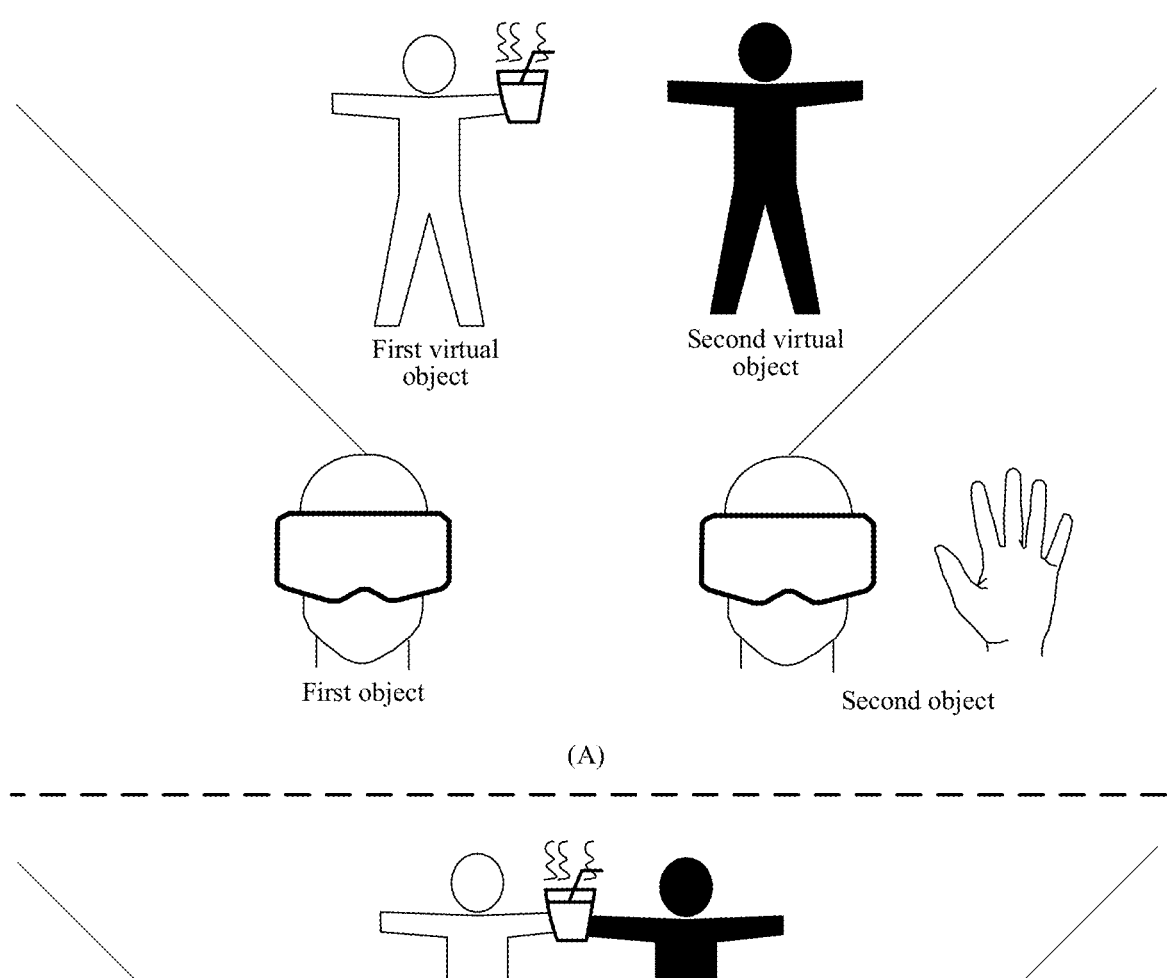
First virtual object
Second virtual object
First object
Second object
(A)
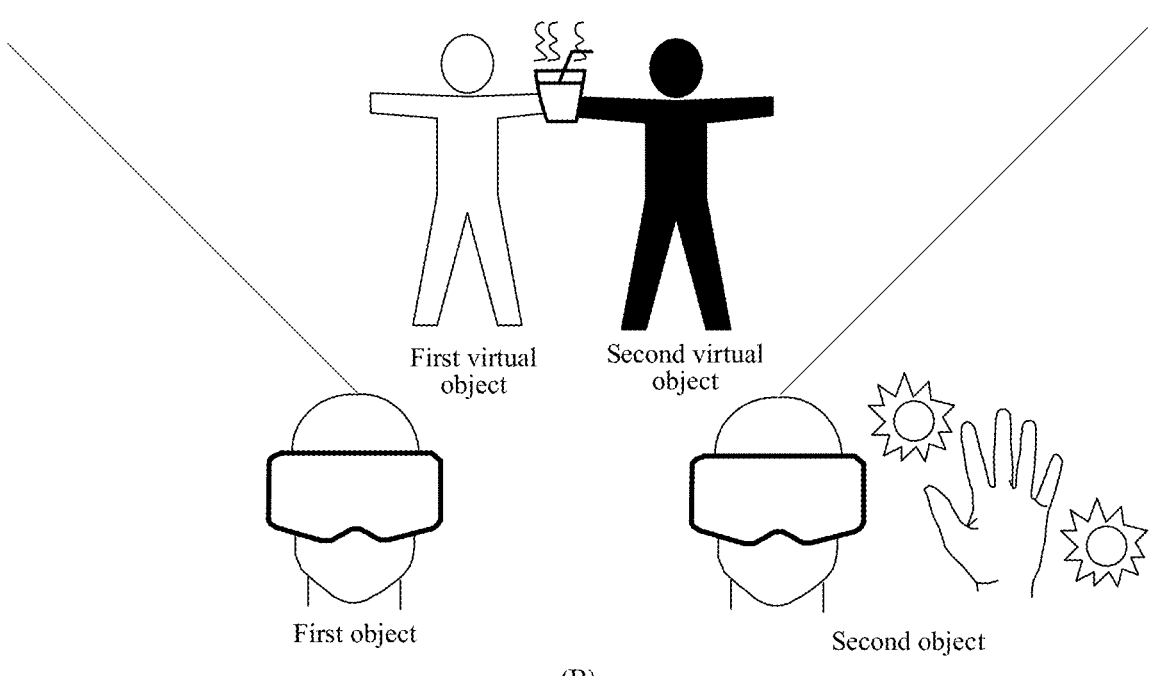
First virtual object
Second virtual object
First object
Second object
(B)
FIG. 25

(A)

(B)

VIRTUAL REALITY INTERACTION

RELATED APPLICATIONS

The present application is a continuation of International Application No. PCT/CN2023/078921, entitled "VIRTUAL REALITY INTERACTION METHOD, RELATED APPARATUS, DEVICE, AND STORAGE MEDIUM" and filed on Mar. 1, 2023, which claims priority to Chinese Patent Application No. 202210705942.4, entitled "VIRTUAL REALITY INTERACTION METHOD, RELATED APPARATUS, DEVICE, AND STORAGE MEDIUM" and filed on Jun. 21, 2022. The entire disclosures of the prior applications are hereby incorporated by reference.

FIELD OF THE TECHNOLOGY

This application relates to the field of virtual reality (VR) technologies, including VR interaction technologies.

BACKGROUND OF THE DISCLOSURE

VR, as the name suggests, is a combination of virtuality and reality. VR technology is a computer simulation system in which a virtual world can be created and experienced. The VR technology uses a computer to generate a simulated environment, and supports immersion of a user into the simulated environment. More specifically, the VR technology generates, based on real-life data, an electronic signal through a computer technology, and combines the electronic signal with various output devices to transform the electronic signal into a phenomenon that can be sensed by the user.

The immersive experience of VR cannot be brought by devices such as mobile phones, computers, and tablets. Currently, VR tactile feedback is mainly implemented through a VR handle and is commonly vibration feedback based on a linear motor, or the like. That is, a force feedback apparatus is provided at a trigger of the handle to give a set reaction force when the user presses. A special tactile expression apparatus may also be provided at the grip of the handle to vibrate to simulate a tactile sensation based on a specified waveform.

However, the related solutions have at least the following problem: The related tactile feedback mode is undiversified, mainly focusing on human-computer interaction scenarios and lacking a sense of interaction between users.

SUMMARY

Embodiments of this disclosure include a VR interaction method, apparatus, and a non-transitory computer-readable storage medium. In this disclosure, an interactive operation between virtual objects is supported in a VR scene in which at least two users interact. In addition, corresponding somatosensory feedback is provided to a real user through a VR kit, thereby improving a sense of interaction between users, and making VR interactive experience more immersive and realistic. Examples of technical solutions in the embodiments of this disclosure may be implemented as follows:

An aspect of this disclosure provides a method for virtual reality (VR) interaction, a plurality of virtual objects in a VR environment is displayed. The plurality of virtual objects includes at least a first virtual object controlled by a first user and a second virtual object controlled by a second user. In response to an interaction initiated by the first virtual object towards the second virtual object, haptic feedback is triggered through a VR device worn by the second user.

An aspect of this disclosure provides a data processing apparatus, including processing circuitry. The processing circuitry is configured to display a plurality of virtual objects in a VR environment, the plurality of virtual objects includes at least a first virtual object controlled by a first user and a second virtual object controlled by a second user. In response to an interaction initiated by the first virtual object towards the second virtual object, the processing circuitry is configured to trigger haptic feedback through a VR device worn by the second user.

An aspect of this disclosure provides a non-transitory computer-readable storage medium storing instructions which when executed by a processor cause the processor to perform any of the methods of this disclosure.

The technical solutions provided in the embodiments of this disclosure can have the following beneficial effects:

The embodiments of this disclosure provide a VR interaction method. That is, at least two virtual objects are displayed in a VR scene. The at least two virtual objects include a first virtual object and a second virtual object. The first virtual object is a virtual object controlled by a first object, and the second virtual object is a virtual object controlled by a second object. A VR kit is controlled to trigger somatosensory feedback in response to an interactive operation triggered by the first virtual object for the second virtual object, the VR kit including at least one VR device worn by the second object. Through the foregoing manner, in the VR scene in which at least two users participate, an interactive operation is supported between virtual objects respectively controlled by the at least two users. Based on this, in combination with an interactive operation in a virtual scene, corresponding somatosensory feedback is provided to a real user through the VR kit, thereby improving a sense of interaction between users, and making VR interactive experience more immersive and realistic. The sense of interaction between users herein means that, in a VR scene in which at least two users participate, an interactive operation is generated between virtual objects controlled by the users, so that somatosensory feedback corresponding to the interactive operation is provided to a real user, thereby enabling the real user to feel the corresponding interactive somatosensory experience.

BRIEF DESCRIPTION OF THE DRAWINGS

FIG. 4 is a schematic flowchart of a VR interaction method according to an embodiment of this disclosure.

FIG. 17 is a schematic diagram of responding to a head accessory wearing operation based on a VR scene according to an embodiment of this disclosure.

FIG. 18 is a schematic diagram of responding to a head accessory removal operation based on a VR scene according to an embodiment of this disclosure.

FIG. 25 is a schematic diagram of responding to a first article transfer operation based on a VR scene according to an embodiment of this disclosure.

DESCRIPTION OF EMBODIMENTS

Figure 1:
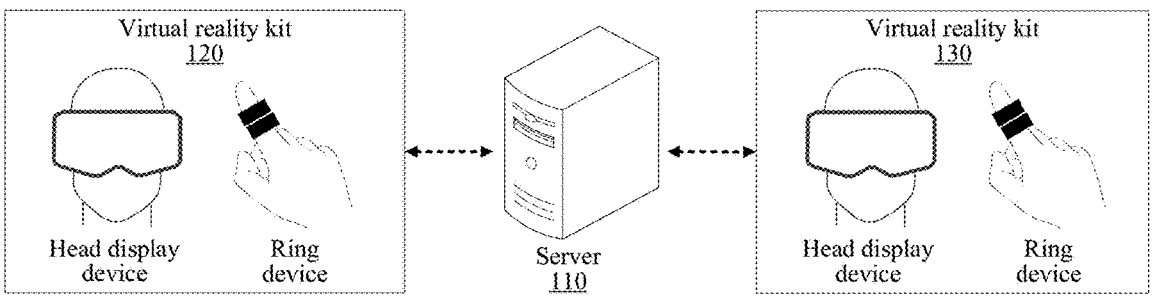
FIG. 1 is a schematic diagram of a physical architecture of a VR interaction system according to an embodiment of this disclosure.

VR technologies have been recognized by an increasing number of people. A user can experience the most realistic feeling in a VR world, in which the realness of an environment is simulated, making it difficult to distinguish the VR world from the real world and allowing the user to be immersive. In addition, VR allows perception functions possessed by humans, for example, hearing, sight, touch, taste, smell, and other perception. Finally, with an excessively strong simulation system, human-computer interaction is truly implemented, allowing the user to operate arbitrarily and obtain the most realistic feedback from the environment during the operation. The immersiveness, interactivity, multi-perceptibility, imagination, autonomy, and other features of the VR technology make it popular with many people. Examples of these features are described below separately. The descriptions of the terms are provided as examples only and are not intended to limit the scope of the disclosure.

(1) Immersiveness.

Immersiveness is an important feature of the VR technology, which is to allow a user to become and feel that the user part of an environment created by a computer system. The immersiveness of the VR technology depends on a perception system of the user. When the user perceives a stimulus (for example, touch, taste, smell, motion perception, and the like) in the virtual world, a thought resonance is generated, resulting in psychological immersion and a feeling of entering the real world.

(2) Interactivity.

Interactivity refers to an operability degree of the user on an object in the simulated environment and a natural degree of obtaining feedback from the environment. The user enters a virtual space. The corresponding technology allows the user to interact with the environment. When the user performs a particular operation, a surrounding environment also reacts. If the user touches an object in the virtual space, the user can feel it in his/her hand. If the user acts on the object, a position and a state of the object may also change.

(3) Multi-Perceptibility.

Multi-perceptibility indicates that the computer technology needs to have many manners of perception, such as hearing, touch, and smell. Currently, perception functions of most VR technologies include sight, hearing, touch, movement, and the like.

(4) Imagination.

Imagination is also referred to as imaginativeness. In the virtual space, the user may interact with surrounding objects. This can broaden a cognition scope of the user and create a scene that does not exist or an impossible environment in the objective world.

(5) Autonomy.

Autonomy refers to a degree to which an object in the virtual environment acts according to a physics law. For example, when pushed by a force, an object may move in the direction of the force, or tip over, fall from a desktop to the ground, or the like.

To achieve better interaction in a virtual scene and achieve a better immersion effect, this disclosure provides a VR interaction method. The method is applied to a VR interaction system shown in FIG. 1. As shown in the figure, the VR interaction system includes a server and at least two VR kits. A server 110, a VR kit 120, and a VR kit 130 shown in the figure are used as an example. The VR kit 120 is a VR kit worn by a real user. The VR kit 130 is a VR kit worn by another real user. The VR kit includes at least one VR device, and a client is installed on the VR device. The client may run on the VR device in a form of a browser, or may run on the VR device in a form of an independent application (APP). A specific presentation form of the client is not limited herein. The server involved in this disclosure may be an independent physical server, or may be a server cluster or a distributed system including a plurality of physical servers, or may be a cloud server that provides basic cloud computing services such as a cloud service, a cloud database, cloud computing, a cloud function, cloud storage, a network service, cloud communication, a middleware service, a domain name service, a security service, a Content Delivery Network (CDN), and big data and artificial intelligence platforms. The VR device may be a head display device, a ring device, a glove device, a belt device, a shoe device, a handle device, clothing, a wearable device, an exoskeleton, or the like, but is not limited thereto. The VR device may be directly or indirectly connected to the server in a wired or wireless communication manner. This is not limited in this disclosure. In addition, quantities of servers and VR devices are not limited.

For example, a virtual object A controlled by a user A and a virtual object B controlled by a user B are in a same VR scene. The user A wears the VR kit 120, the user B wears the VR kit 130, and the VR kit 120 establishes a communication connection with the VR kit 130 through the server 110. When the user A controls the virtual object A to trigger an action to the virtual object B, the user B receives corresponding somatosensory feedback through the VR kit 130 worn by the user B.

Figure 2:
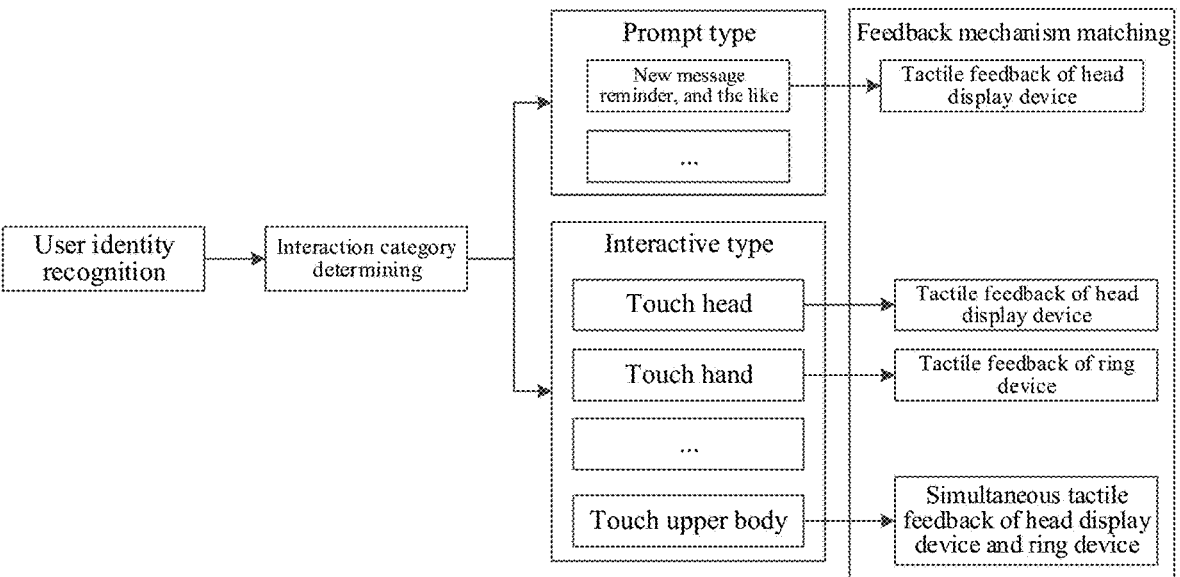
FIG. 2 is a schematic diagram of a logical architecture of a VR interaction system according to an embodiment of this disclosure.

Based on the physical architecture of the VR interaction system shown in FIG. 1, a logical architecture of the VR interaction system is described below with reference to FIG. 2. FIG. 2 is a schematic diagram of a logical architecture of a VR interaction system according to an embodiment of this disclosure. As shown in the figure, when a virtual object controlled by a user receives a prompt or triggers interaction in a VR scene, a backend matches a corresponding tactile feedback mechanism, and corresponding tactile feedback is provided to the user through an ultrasonic sensing module built in a VR device (for example, a head display device or a ring device). Specifically:

First, user identity recognition is performed. That is, identification is performed based on an APP identity document (ID) when a user logs in to a VR APP. Next, an interaction category is determined. A new message reminder mainly belongs to a prompt type of interaction, and triggering an interactive action in a specific scenario belongs to an interactive type of interaction. When determining whether to trigger an interactive action, a position of a hand is mainly identified through a VR device (for example, a ring device or a glove device). Finally, a feedback mechanism is matched. For example, for head interaction, one vibration may be fed back through a head display device worn by the user. For another example, for hand interaction, one vibration may be fed back through a ring device worn by the user. That is, corresponding tactile vibration feedback is provided to the user through an ultrasonic sensor built in the VR device worn by the user.

In addition to providing vibration feedback, the VR device in this disclosure can also provide other types of feedback. The feedback types include but are not limited to gas feedback, liquid feedback, pressure sensing feedback, and the like. This is not limited herein.

Figure 3:
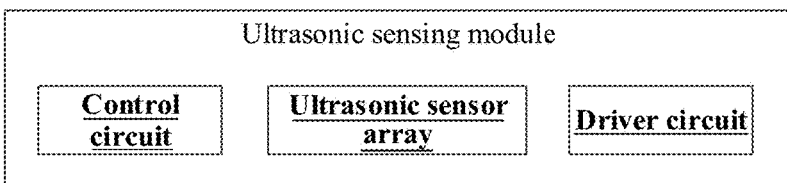
FIG. 3 is a schematic structural diagram of an ultrasonic sensing module according to an embodiment of this disclosure.

In view of the fact that an ultrasonic sensing module is built in the VR device, for case of understanding, referring to FIG. 3, FIG. 3 is a schematic structural diagram of an ultrasonic sensing module according to an embodiment of this disclosure. As shown in the figure, the ultrasonic sensing module usually includes an ultrasonic sensor array, a control circuit, and a driver circuit. The ultrasonic sensor array is mainly divided into a transmitting part and a receiving part.

The transmitting part mainly includes a transmitter and a transducer. The transducer can convert energy generated during vibration of a piezoelectric wafer excited by a voltage into an ultrasonic wave. The transmitter transmits the generated ultrasonic wave.

The receiving part mainly includes a transducer and an amplifier circuit. The transducer receives the reflected ultrasonic wave. During the receiving of the ultrasonic wave, mechanical vibration is generated. Therefore, the transducer can convert mechanical energy into an electrical signal, and then the amplifier circuit amplifies the generated electrical signal.

With reference to the foregoing descriptions, a VR interaction method in this disclosure is described below. Referring to FIG. 4, the VR interaction method in the embodiments of this disclosure may be performed by a terminal device. The terminal device may be specifically a VR device. The VR interaction method provided in this disclosure includes:

210: Display at least two virtual objects in a VR scene, the at least two virtual objects including a first virtual object and a second virtual object, the first virtual object being a virtual object controlled by a first object, and the second virtual object being a virtual object controlled by a second object. For example, a plurality of virtual objects in a VR environment is displayed, the plurality of virtual objects includes at least a first virtual object controlled by a first user and a second virtual object controlled by a second user.

In one or more embodiments, in the VR scene, at least two virtual objects are displayed. This disclosure is to be described by using an example in which the at least two virtual objects include a first virtual object and a second virtual object. However, this is not to be construed as a limitation to this disclosure. The virtual object may be a character image, a cartoon image, or the like. This is not limited herein.

Specifically, the first object (that is, the user A) wears a VR kit and enters the VR scene with an identity of the first virtual object. Similarly, the second object (that is, the user B) also wears a VR kit and enters the VR scene with an identity of the second virtual object. Based on this, the first object may control, through the VR kit, the first virtual object to interact with the second virtual object. Similarly, the second object may also control, through the VR kit, the second virtual object to interact with the first virtual object.

The VR scene involved in this disclosure includes but is not limited to a game scene, an industrial manufacturing scene, a medical scene, an educational scene, a shopping scene, an office conference scene, a training scene, a safety drill scene, a live broadcast scene, a home architectural design scene, and the like. The VR kit involved in this disclosure includes one or more VR devices.

220: Control a VR kit to trigger somatosensory feedback in response to an interactive operation triggered by the first virtual object for the second virtual object, the VR kit including at least one VR device worn by the second object. For example, in response to an interaction initiated by the first virtual object towards the second virtual object, haptic feedback is triggered through a VR device worn by the second user.

In one or more embodiments, in the VR scene, an interactive operation between different virtual objects is supported. Based on a type and intensity of the interactive operation, the VR kit may be controlled to trigger somatosensory feedback.

Specifically, the first object (that is, the user A) controls the first virtual object to trigger an interactive operation to the second virtual object controlled by the second object (that is, the user B). In this case, the VR kit worn by the second object (that is, the user B) responds to the interactive operation and triggers corresponding somatosensory feedback. In one embodiment, the VR kit worn by the first object (that is, the user A) may also respond to the interactive operation and trigger corresponding somatosensory feedback.

The embodiments of this disclosure provide a VR interaction method. Through the foregoing manner, an interactive operation between virtual objects is supported in a VR scene in which at least two users interact. Based on this, in combination with the interactive operation in the VR scene, corresponding somatosensory feedback is provided to a real user through a VR kit, thereby improving a sense of interaction between users, and making VR interactive experience more immersive and realistic.

In one embodiment, based on the foregoing embodiments corresponding to FIG. 4, in another embodiment provided in the embodiments of this disclosure, the controlling a VR kit to trigger somatosensory feedback in response to an interactive operation triggered by the first virtual object for the second virtual object may specifically include:

controlling a head display device in the VR kit to trigger vibration feedback in response to a session message transmitted by the first virtual object for the second virtual object.

In one or more embodiments, a feedback manner for a session message in a social VR scene is described. As can be learned from the foregoing embodiments, the VR scene supports a real user in creating a virtual object belonging to the real user and controlling the virtual object to perform activities in the VR scene. The social VR scene is used as an example for description below.

Figure 5:
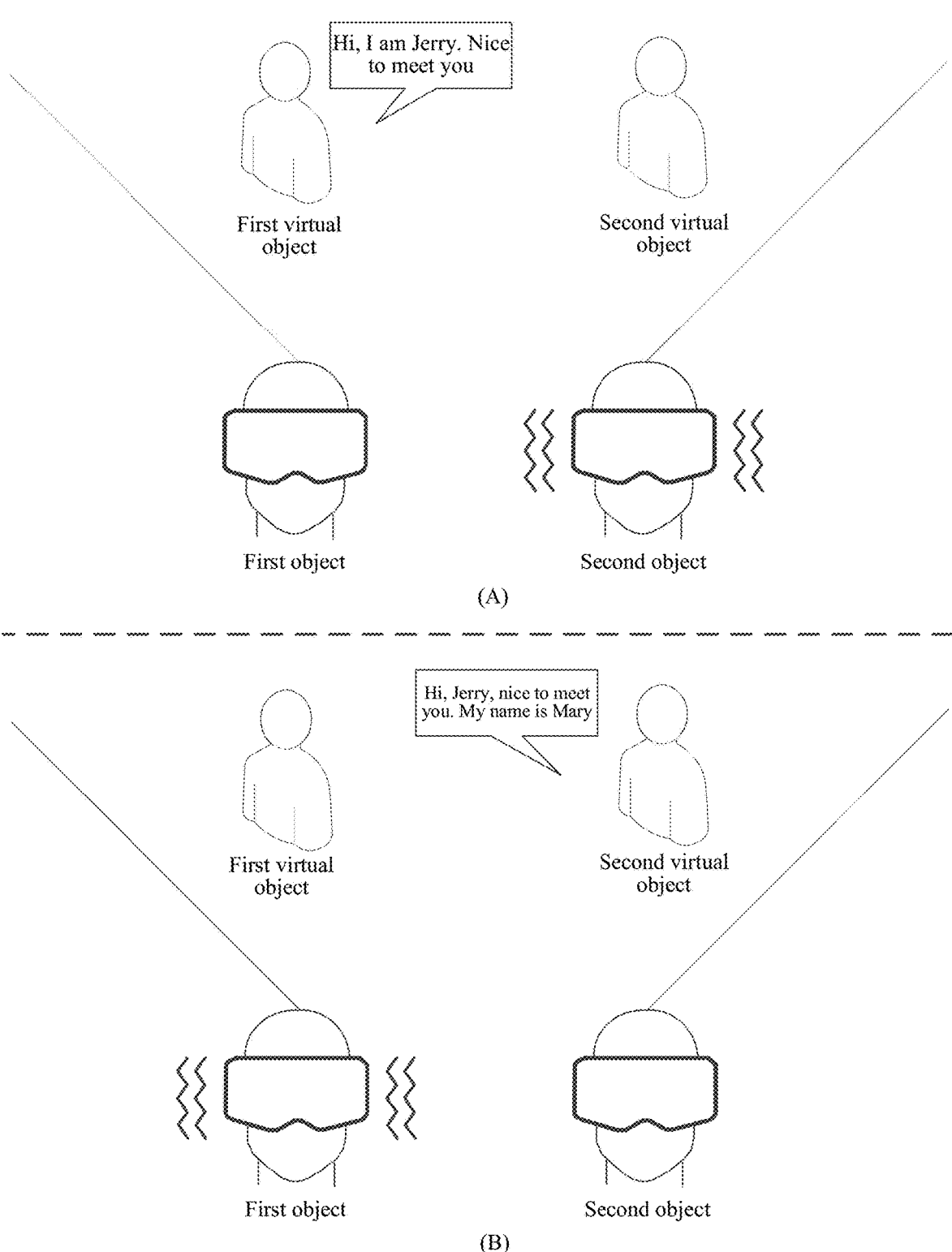
FIG. 5 is a schematic diagram of responding to a session message based on a VR scene according to an embodiment of this disclosure.

Specifically, for ease of understanding, referring to FIG. 5, FIG. 5 is a schematic diagram of responding to a session message based on a VR scene according to an embodiment of this disclosure. As shown in (A) of FIG. 5, a first object controls a first virtual object, and a second object controls a second virtual object. For example, the first object controls the first virtual object to transmit a session message to the second virtual object. For example, the session message is "Hi, I am Jerry. Nice to meet you". Based on this, when the second virtual object receives the session message, a head display device worn by the second object triggers vibration feedback.

Similarly, as shown in (B) of FIG. 5, the second object may control the second virtual object to reply to the session message transmitted by the first object through the first virtual object. For example, the second object controls the second virtual object to transmit a session message to the first virtual object. For example, the session message is "Hi, Jerry, nice to meet you. My name is Mary". Based on this, when the first virtual object receives the session message, a head display device worn by the first object triggers vibration feedback.

A quantity of virtual objects, images of the virtual objects, a quantity of session messages, contents of the session messages, and the like shown in FIG. 5 are all schematic and are not to be construed as a limitation on this disclosure.

The vibration feedback provided by the head display device may be one vibration, or may be several continuous vibrations.

Subsequently, the embodiments of this disclosure provide a feedback manner for a session message in a social VR scene. Through the foregoing manner, in the VR scene, a real user may sense, through a VR kit, a session message transmitted by another user. This enriches the diversity of VR tactile feedback and the functionality of interaction carriers. In addition, in combination with the social VR scene, more diversified interaction manners are provided, allowing the user to feel a more realistic sense of socialization, thereby helping improve the fun of interactive experience.

In one embodiment, based on the foregoing embodiments corresponding to FIG. 4, in another embodiment provided in the embodiments of this disclosure, the controlling a VR kit to trigger somatosensory feedback in response to an interactive operation triggered by the first virtual object for the second virtual object may specifically include:

controlling a head display device in the VR kit to trigger vibration feedback in response to a non-contact interactive message transmitted by the first virtual object for the second virtual object.

In one or more embodiments, a feedback method for a non-contact interactive message in a social VR scene is described. As can be learned from the foregoing embodiments, the VR scene supports a real user in creating a virtual object belonging to the real user and controlling the virtual object to perform activities in the VR scene. The social VR scene is used as an example for description below.

Figure 6:
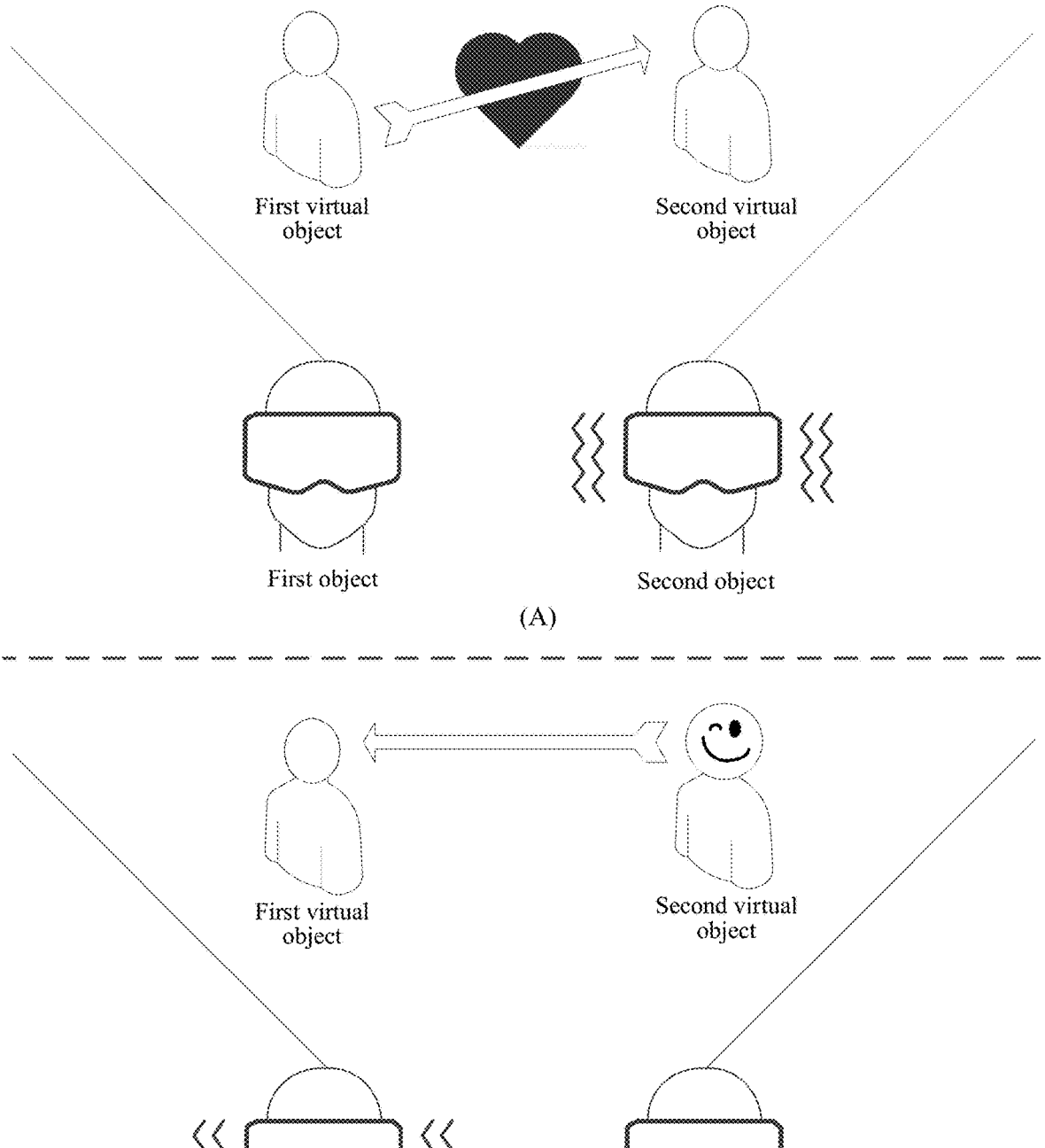
FIG. 6 is a schematic diagram of responding to a non-contact interactive message based on a VR scene according to an embodiment of this disclosure.

Specifically, for ease of understanding, referring to FIG. 6, FIG. 6 is a schematic diagram of responding to a non-contact interactive message based on a VR scene according to an embodiment of this disclosure. As shown in (A) of FIG. 6, a first object controls a first virtual object, and a second object controls a second virtual object. For example, the first object controls the first virtual object to transmit a non-contact interactive message to the second virtual object. For example, the non-contact interactive message is a "love" message, which may be expressed by transmitting a heart emoticon or transmitting a kiss emoticon. Based on this, when the second virtual object receives the "love" message, a head display device worn by the second object triggers vibration feedback.

Similarly, as shown in (B) of FIG. 6, the second object may control the second virtual object to reply to the "love" message transmitted by the first object through the first virtual object. For example, the second object may control the second virtual object to transmit a non-contact interactive message to the first virtual object. For example, the non-contact interactive message is a "wink" message. Based on this, when the first virtual object receives the "wink" message, a head display device worn by the first object triggers vibration feedback.

A quantity of virtual objects, images of the virtual objects, a quantity of non-contact interactive messages, contents of the non-contact interactive messages, and the like shown in FIG. 6 are all schematic and are not to be construed as a limitation on this disclosure.

The vibration feedback provided by the head display device may be one vibration, or may be several continuous vibrations. The non-contact interactive message includes, but is not limited to, "love", "respect", "thumbs up", "wink", and the like.

Subsequently, the embodiments of this disclosure provide a feedback manner for a non-contact interactive message in a social VR scene. Through the foregoing manner, in the VR scene, a real user may sense, through a VR kit, a non-contact interactive message transmitted by another user. This enriches the diversity of VR tactile feedback and the functionality of interaction carriers. In addition, in combination with the social VR scene, more diversified interaction manners are provided, allowing the user to feel a more realistic sense of socialization, thereby helping improve the fun of interactive experience.

In one embodiment, based on the foregoing embodiments corresponding to FIG. 4, in another embodiment provided in the embodiments of this disclosure, the controlling a VR kit to trigger somatosensory feedback in response to an inter- active operation triggered by the first virtual object for the second virtual object may specifically include:

controlling a head display device in the VR kit to trigger vibration feedback in response to an email transmitted by the first virtual object, a recipient of the email including the second virtual object.

In one or more embodiments, a feedback manner for an email in an office VR scene is described. As can be learned from the foregoing embodiments, the VR scene supports a real user in creating a virtual object belonging to the real user and controlling the virtual object to perform activities in the VR scene. The office VR scene is used as an example for description below.

Figure 7:
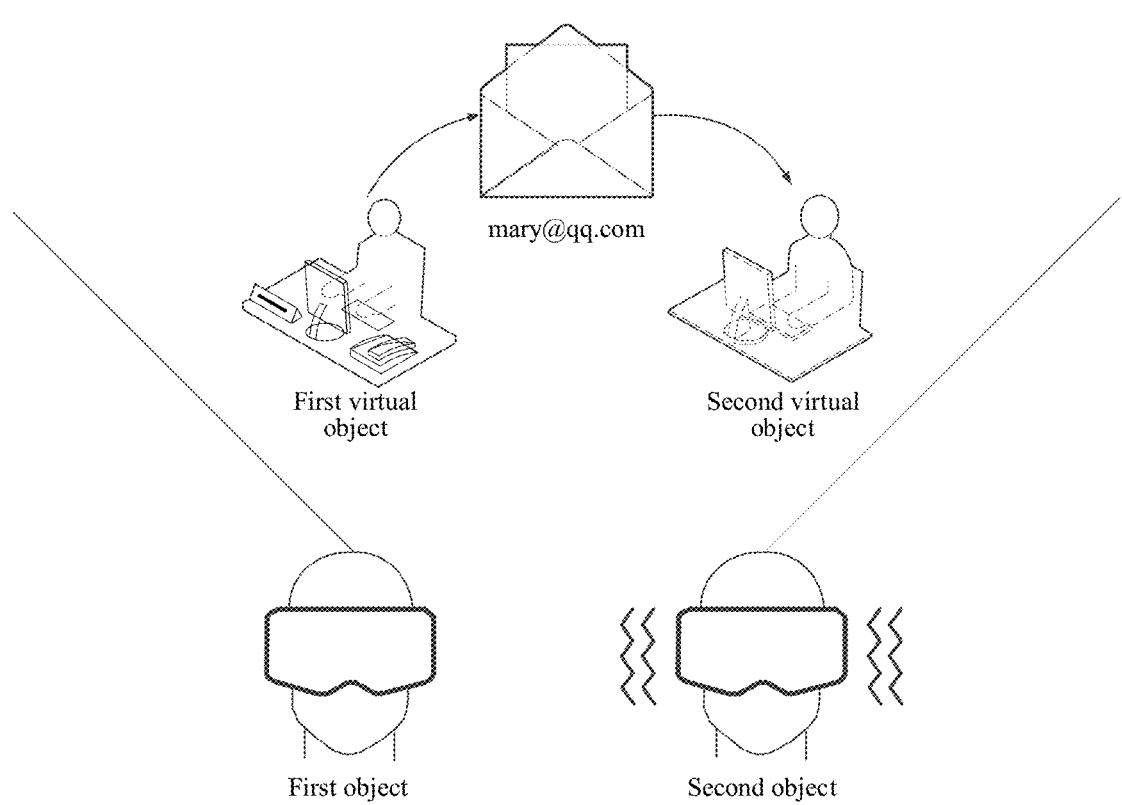
FIG. 7 is a schematic diagram of receiving a mail based on a VR scene according to an embodiment of this disclosure.

Specifically, for ease of understanding, referring to FIG. 7, FIG. 7 is a schematic diagram of receiving a mail based on a VR scene according to an embodiment of this disclosure. As shown in the figure, a first object controls a first virtual object, and a second object controls a second virtual object. For example, the first object controls the first virtual object to transmit an email. A recipient of the email includes the second virtual object. That is, an email address of the recipient of the email includes an email address (for example, mary@qq.com) of the second virtual object. Based on this, when the second virtual object receives the email, a head display device worn by the second object triggers vibration feedback.

A quantity of virtual objects, images of the virtual objects, a quantity of emails, contents of the emails, and the like shown in FIG. 7 are all schematic and are not to be construed as a limitation on this disclosure.

The vibration feedback provided by the head display device may be one vibration, or may be several continuous vibrations.

Subsequently, the embodiments of this disclosure provide a feedback manner for an email in an office VR scene. Through the foregoing manner, in the VR scene, a real user may sense, through a VR kit, an email transmitted by another user. This enriches the diversity of VR tactile feedback and the functionality of interaction carriers. In addition, in combination with the office VR scene, more diversified interaction manners are provided, allowing the user to be immersive, thereby helping improve the fun of interactive experience.

In one embodiment, based on the foregoing embodiments corresponding to FIG. 4, in another embodiment provided in the embodiments of this disclosure, the controlling a VR kit to trigger somatosensory feedback in response to an inter- active operation triggered by the first virtual object for the second virtual object may specifically include:

controlling a head display device in the VR kit to trigger vibration feedback in response to an electronic file transmitted by the first virtual object for the second virtual object.

In one or more embodiments, a feedback manner for an electronic file in an office VR scene is described. As can be learned from the foregoing embodiments, the VR scene supports a real user in creating a virtual object belonging to the real user and controlling the virtual object to perform activities in the VR scene. The office VR scene is used as an example for description below.

Figure 8:
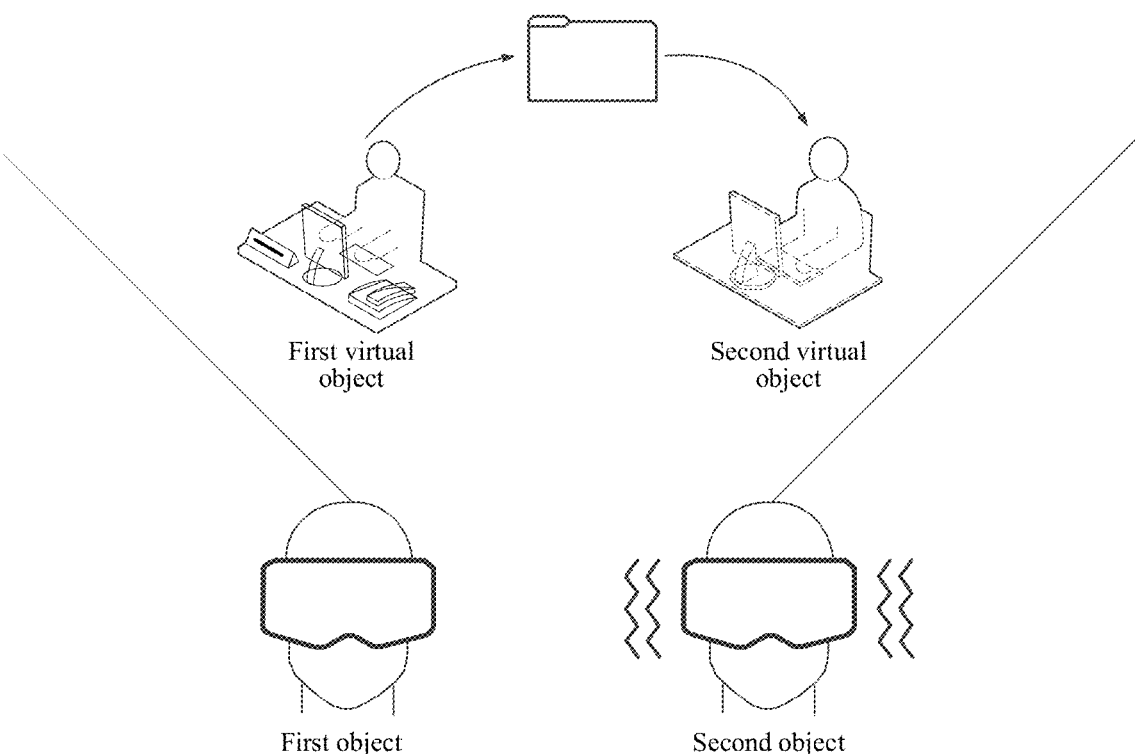
FIG. 8 is a schematic diagram of responding to file transmission based on a VR scene according to an embodiment of this disclosure.

Specifically, for case of understanding, referring to FIG. 8, FIG. 8 is a schematic diagram of responding to file transmission based on a VR scene according to an embodiment of this disclosure. As shown in the figure, a first object controls a first virtual object, and a second object controls a second virtual object. For example, the first object controls the first virtual object to transmit an electronic file to the second virtual object. Based on this, when the second virtual object receives the electronic file, a head display device worn by the second object triggers vibration feedback.

A quantity of virtual objects, images of the virtual objects, a quantity of electronic files, contents of the electronic files, and the like shown in FIG. 8 are all schematic and are not to be construed as a limitation on this disclosure.

The vibration feedback provided by the head display device may be one vibration, or may be several continuous vibrations. The electronic file includes but is not limited to a text file, an image file, a graphic file, a video file, a sound file, a hypermedia link file, a program file, a data file, and the like.

Subsequently, the embodiments of this disclosure provide a feedback manner for an electronic file in an office VR scene. Through the foregoing manner, in the VR scene, a real user may sense, through a VR kit, an electronic file transmitted by another user. This enriches the diversity of VR tactile feedback and the functionality of interaction carriers. In addition, in combination with the office VR scene, diversified interaction manners are provided, allowing the user to be immersive, thereby helping improve the fun of interactive experience.

In one embodiment, based on the foregoing embodiments corresponding to FIG. 4, in another embodiment provided in the embodiments of this disclosure, the controlling a VR kit to trigger somatosensory feedback in response to an inter- active operation triggered by the first virtual object for the second virtual object may specifically include:

controlling a head display device in the VR kit to trigger vibration feedback in response to a team invitation message transmitted by the first virtual object for the second virtual object.

In one or more embodiments, a feedback manner for a team invitation message in a game VR scene is described. As can be learned from the foregoing embodiments, the VR scene supports a real user in creating a virtual object belonging to the real user and controlling the virtual object to perform activities in the VR scene. The game VR scene is used as an example for description below.

Figure 9:
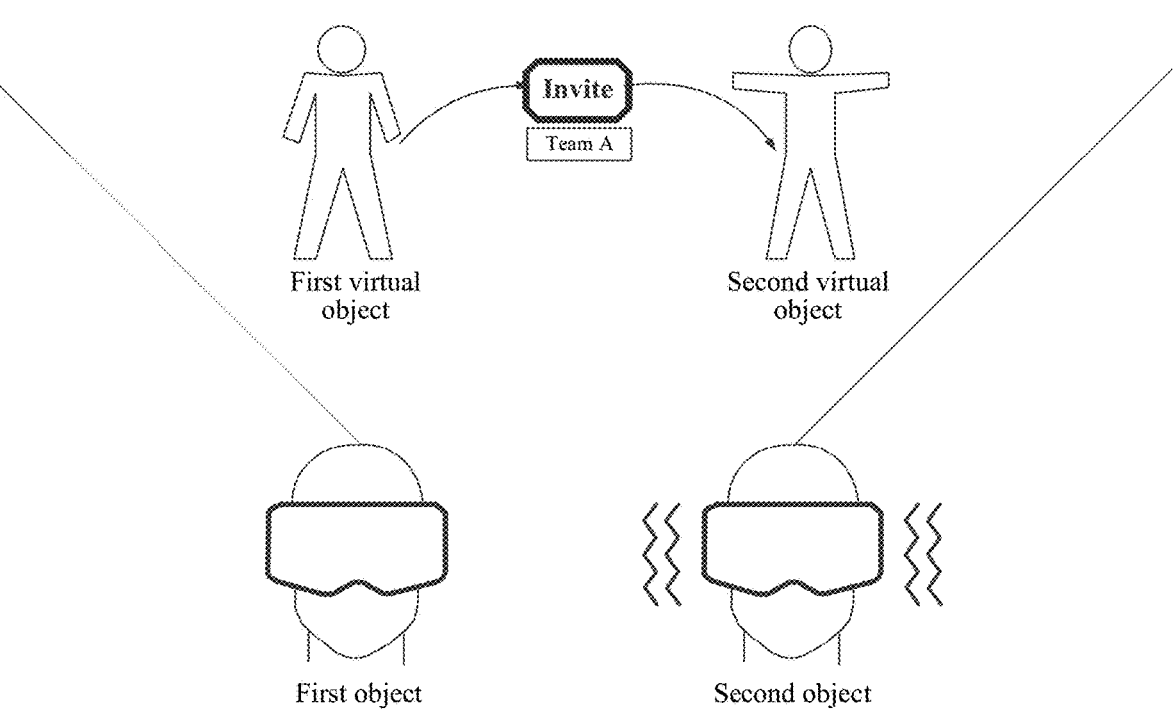
FIG. 9 is a schematic diagram of responding to a team invitation message based on a VR scene according to an embodiment of this disclosure.

Specifically, for ease of understanding, referring to FIG. 9, FIG. 9 is a schematic diagram of responding to a team invitation message based on a VR scene according to an embodiment of this disclosure. As shown in the figure, a first object controls a first virtual object, and a second object controls a second virtual object. For example, the first object controls the first virtual object to create a "team A" in a game, and then the first object controls the first virtual object to transmit a team invitation message for the "team A" to the second virtual object, that is, to invite the second virtual object to join the "team A" for the game. Based on this, when the second virtual object receives the team invitation message, a head display device worn by the second object triggers vibration feedback.

A quantity of virtual objects, images of the virtual objects, a game type, and the like shown in FIG. 9 are all schematic and are not to be construed as a limitation on this disclosure.

The vibration feedback provided by the head display device may be one vibration, or may be several continuous vibrations. The game type includes, but is not limited to, a multiplayer online battle arena (MOBA), a real-time strategy (RTS) game, a role-playing game (RPG), a first-person shooting (FPS) game, and the like.

Subsequently, the embodiments of this disclosure provide a feedback manner for a team invitation message in a game VR scene. Through the foregoing manner, in the VR scene, a real user may sense, through a VR kit, a team invitation message initiated by another user. This enriches the diversity of VR tactile feedback and the functionality of interaction carriers. In addition, in combination with the game VR scene, more diversified interactive manners are provided, allowing the user to be immersive, thereby helping improve the fun of interactive experience.

In one embodiment, based on the foregoing embodiments corresponding to FIG. 4, in another embodiment provided in the embodiments of this disclosure, the controlling a VR kit to trigger somatosensory feedback in response to an inter-active operation triggered by the first virtual object for the second virtual object may specifically include:

controlling a head display device in the VR kit to trigger vibration feedback in response to a roll call prompt message transmitted by the first virtual object for the second virtual object.

In one or more embodiments, a feedback manner for a roll call prompt message in a remote education VR scene is described. As can be learned from the foregoing embodiments, the VR scene supports a real user in creating a virtual object belonging to the real user and controlling the virtual object to perform activities in the VR scene. The remote education VR scene is used as an example for description below.

Figure 10:
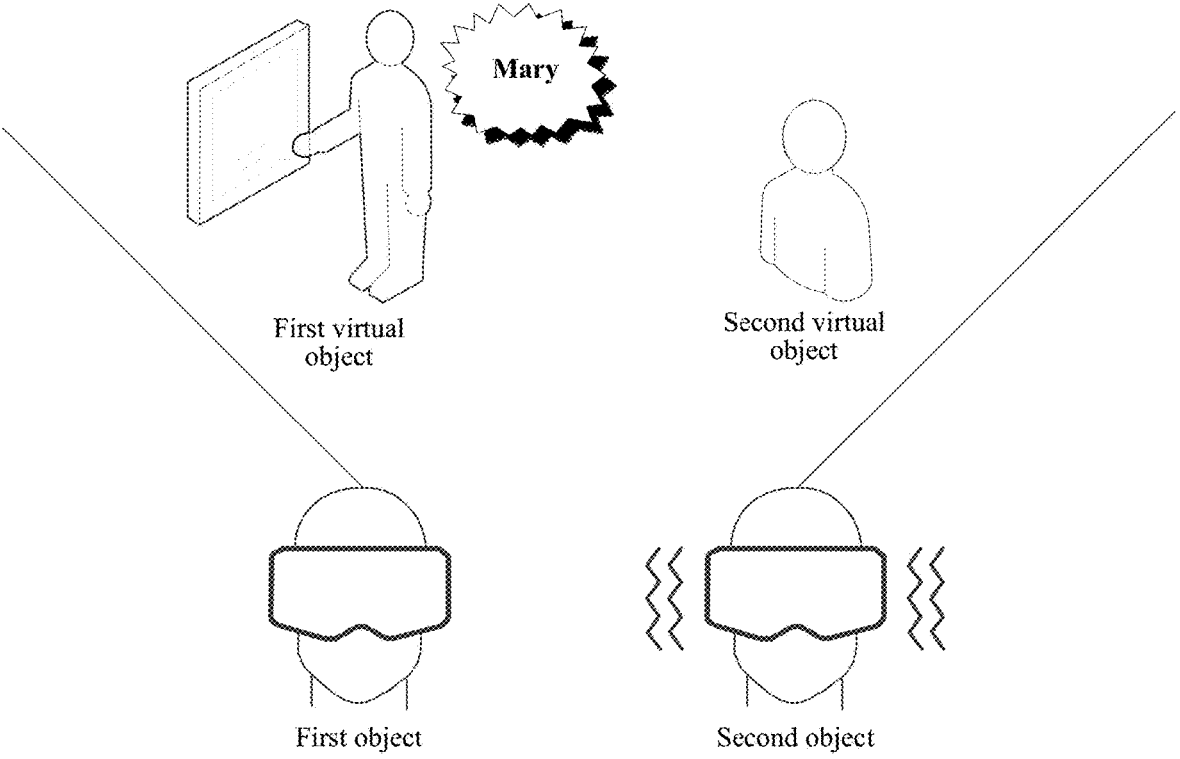
FIG. 10 is a schematic diagram of responding to a roll call prompt message based on a VR scene according to an embodiment of this disclosure.

Specifically, for case of understanding, referring to FIG. 10, FIG. 10 is a schematic diagram of responding to a roll call prompt message based on a VR scene according to an embodiment of this disclosure. As shown prompt figure, a first object controls a first virtual object, and a second object controls a second virtual object. For example, the first object controls the first virtual object to give a lesson, and initiates a roll call for the second virtual object during the lesson, that is, transmits a roll call prompt message to the second virtual object. For example, a name of the second virtual object is "Mary". When the first virtual object names "Mary", a roll call prompt message for the second virtual object is transmitted. Based on this, when the second virtual object receives the roll call prompt message, a head display device worn by the second object triggers vibration feedback.

A quantity of virtual objects, images of the virtual objects, and the like shown in FIG. 10 are all schematic and are not to be construed as a limitation on this disclosure.

The vibration feedback provided by the head display device may be one vibration, or may be several continuous vibrations.

Subsequently, the embodiments of this disclosure provide a feedback manner for a roll call prompt message in a remote education VR scene. Through the foregoing manner, in the VR scene, a real user may sense, through a VR kit, a roll call prompt message initiated by another user. This enriches the diversity of VR tactile feedback and the functionality of interaction carriers. In addition, in combination with the remote education VR scene, more diversified interaction manners are provided, allowing the user to be immersive, thereby helping improve a teaching effect.

In one embodiment, based on the foregoing embodiments corresponding to FIG. 4, in another embodiment provided in the embodiments of this disclosure, the VR kit may include a head display device and a ring device. Correspondingly, the controlling a VR kit to trigger somatosensory feedback in response to an interactive operation triggered by the first virtual object for the second virtual object may specifically include:

controlling the head display device and the ring device to trigger vibration feedback in response to upper body contact triggered by the first virtual object for the second virtual object.

In one or more embodiments, a manner of triggering head and hand feedback based on upper body contact is described. As can be learned from the foregoing embodiments, in the VR scene, triggering of an interactive action between virtual objects is also supported. Specifically, the first virtual object may touch an upper body of the second virtual object, that is, upper body contact is triggered for the second virtual object. Based on this, the head display device and the ring device worn by the second object trigger vibration feedback at the same time.

Figure 11:
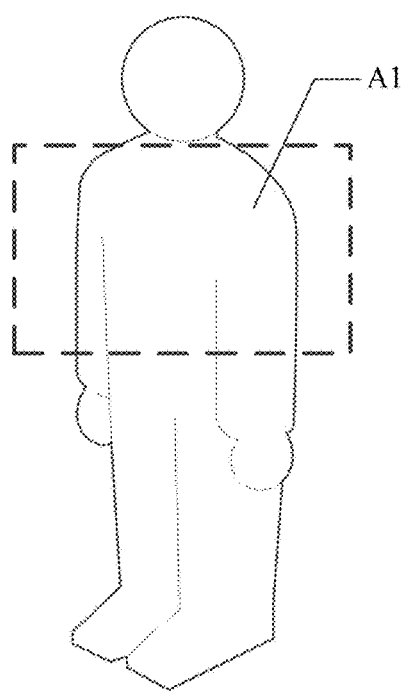
FIG. 11 is a schematic diagram of an upper body of a virtual object according to an embodiment of this disclosure.

Specifically, for ease of understanding, referring to FIG. 11, FIG. 11 is a schematic diagram of an upper body of a virtual object according to an embodiment of this disclosure. As shown in the figure, A1 is used for indicating the upper body of the virtual object. The upper body may be understood as an upper half of the body other than the head and hands. An example is used in which both the first virtual object and the second virtual object are character images. If the first virtual object touches the upper body of the second virtual object, this may be determined as upper body inter-action, that is, upper body touching.

Subsequently, the embodiments of this disclosure provide a manner of triggering head and hand feedback based on upper body contact. Through the foregoing manner, in the VR scene, upper body interaction between virtual objects is supported, thereby enriching the diversity of VR tactile feedback and the functionality of interaction carriers.

In one embodiment, based on the foregoing embodiments corresponding to FIG. 4, in another embodiment provided in the embodiments of this disclosure, the responding to upper body contact triggered by the first virtual object for the second virtual object may specifically include:

responding to a touch operation triggered by the first virtual object on a shoulder area of the second virtual object;

responding to a touch operation triggered by the first virtual object on an arm area of the second virtual object;

responding to a touch operation triggered by the first virtual object on a back area of the second virtual object; or responding to a touch operation triggered by the first virtual object on a waist area of the second virtual object.

In one or more embodiments, a manner of responding to upper body contact in a VR scene is described. As can be learned from the foregoing embodiments, the VR scene supports a real user in creating a virtual object belonging to the real user and controlling the virtual object to perform interaction in the VR scene. Descriptions are provided below with reference to different interactive scenarios.

Figure 12:
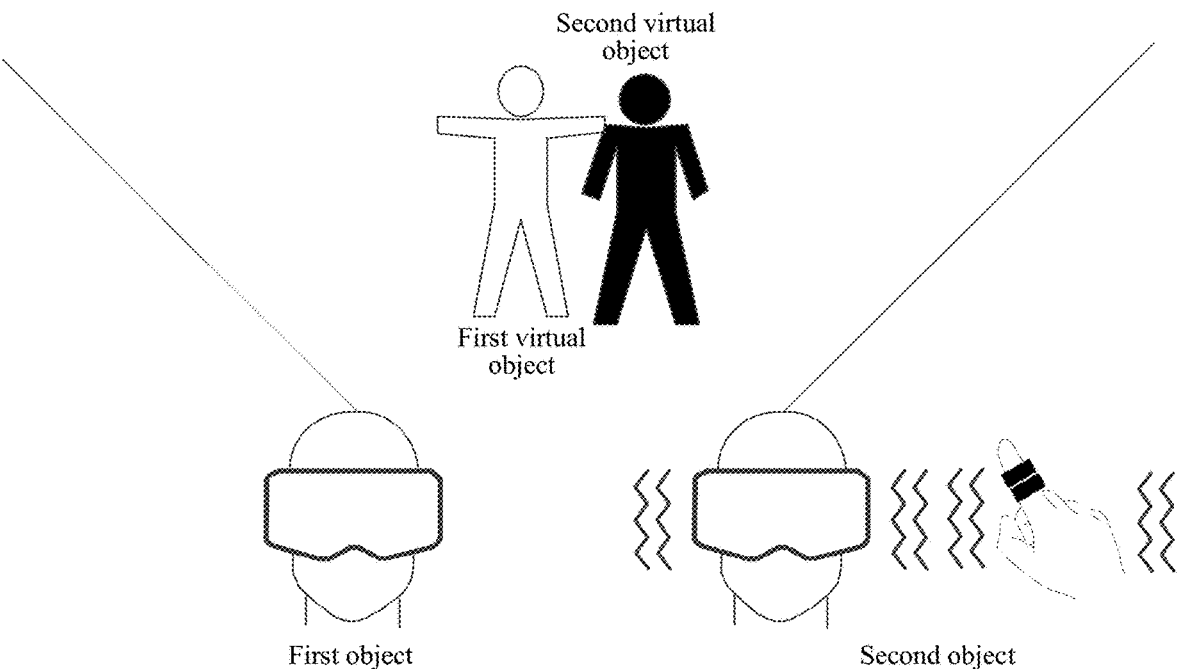
FIG. 12 is a schematic diagram of responding to a shoulder area touch operation based on a VR scene according to an embodiment of this disclosure.

For example, for ease of understanding, referring to FIG. 12, FIG. 12 is a schematic diagram of responding to a shoulder area touch operation based on a VR scene according to an embodiment of this disclosure. As shown in the figure, a first object controls a first virtual object, and a second object controls a second virtual object. The first object controls the first virtual object to walk to the second virtual object, and then taps a shoulder area of the second virtual object. That is, the first virtual object triggers a touch operation on the shoulder area of the second virtual object. Based on this, a head display device and a ring device worn by the second object trigger vibration feedback at the same time.

Figure 13:
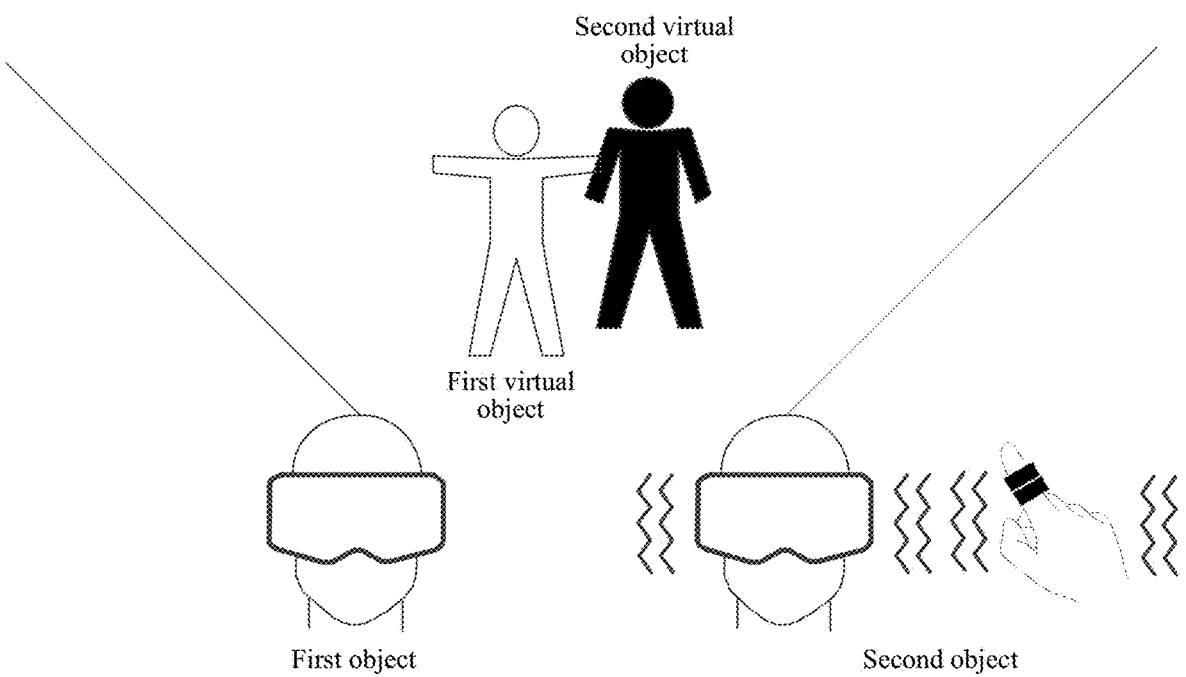
FIG. 13 is a schematic diagram of responding to an arm area touch operation based on a VR scene according to an embodiment of this disclosure.

For example, for ease of understanding, referring to FIG. 13, FIG. 13 is a schematic diagram of responding to an arm area touch operation based on a VR scene according to an embodiment of this disclosure. As shown in the figure, a first object controls a first virtual object, and a second object controls a second virtual object. The first object controls the first virtual object to walk to the second virtual object, and then taps an arm area of the second virtual object. That is, the first virtual object triggers a touch operation on the arm area of the second virtual object. Based on this, a head display device and a ring device worn by the second object trigger vibration feedback at the same time.

Figure 14:
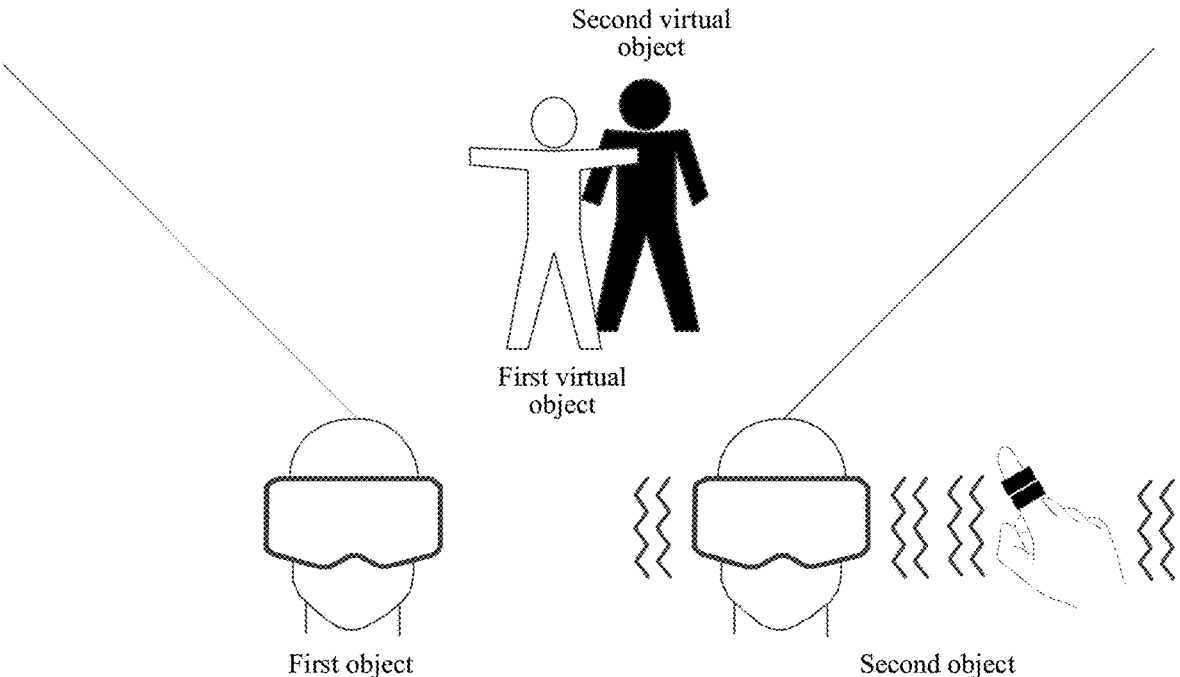
FIG. 14 is a schematic diagram of responding to a back area touch operation based on a VR scene according to an embodiment of this disclosure.

For example, for case of understanding, referring to FIG. 14, FIG. 14 is a schematic diagram of responding to a back area touch operation based on a VR scene according to an embodiment of this disclosure. As shown in the figure, a first object controls a first virtual object, and a second object controls a second virtual object. The first object controls the first virtual object to walk to the second virtual object, and then taps a back area of the second virtual object. That is, the first virtual object triggers a touch operation on the back area of the second virtual object. Based on this, a head display device and a ring device worn by the second object trigger vibration feedback at the same time.

Figure 15:
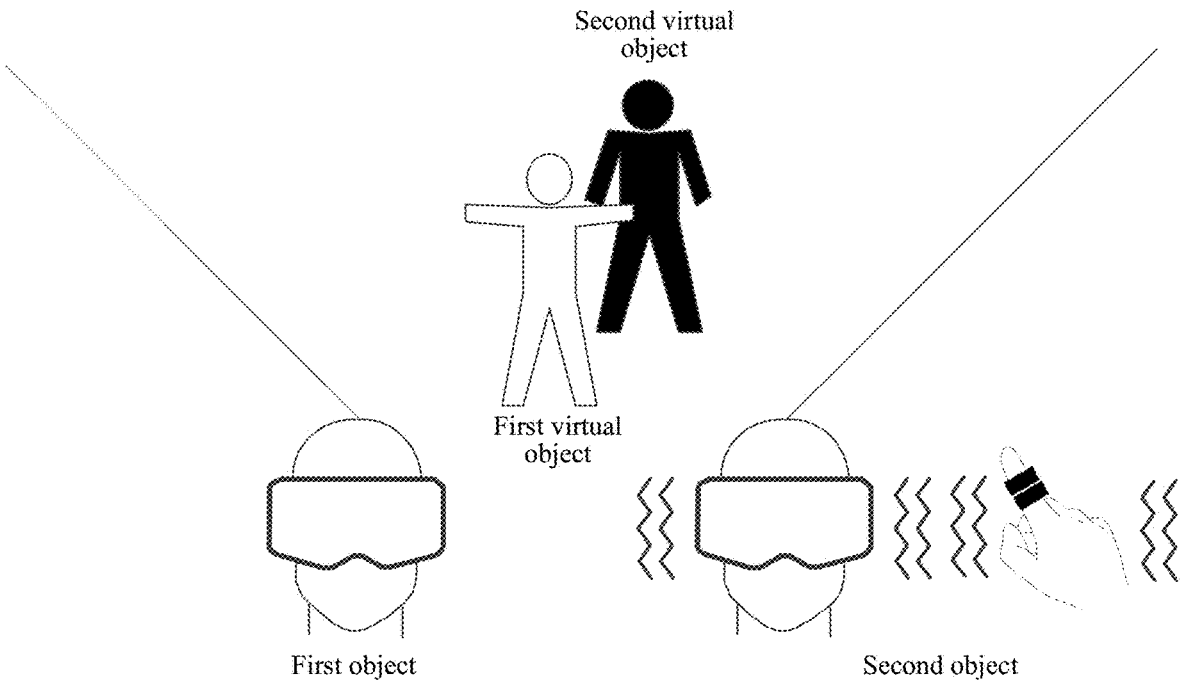
FIG. 15 is a schematic diagram of responding to a waist area touch operation based on a VR scene according to an embodiment of this disclosure.

For example, for ease of understanding, referring to FIG. 15, FIG. 15 is a schematic diagram of responding to a waist area touch operation based on a VR scene according to an embodiment of this disclosure. As shown in the figure, a first object controls a first virtual object, and a second object controls a second virtual object. The first object controls the first virtual object to walk to the second virtual object, and then taps a waist area of the second virtual object. That is, the first virtual object triggers a touch operation on the waist area of the second virtual object. Based on this, a head display device and a ring device worn by the second object trigger vibration feedback at the same time.

A quantity of virtual objects, images of the virtual objects, and the like shown in each of FIG. 12 to FIG. 15 are all schematic and are not to be construed as a limitation on this disclosure.

The vibration feedback provided by the head display device and the ring device may be one vibration, or may be several continuous vibrations. A quantity of vibrations of the head display device may be the same as or different from a quantity of vibrations of the ring device.

Subsequently, the embodiments of this disclosure provide a manner of responding to upper body contact in a VR scene. Through the foregoing manner, in the VR scene, a real user may sense, through a VR kit, an upper body contact operation triggered by another user. This enriches the diversity of VR tactile feedback and the functionality of interaction carriers, improves the realism of the interaction process, and allows the user to be immersive.

In one embodiment, based on the foregoing embodiments corresponding to FIG. 4, in another embodiment provided in the embodiments of this disclosure, the controlling the head display device and the ring device to trigger vibration feedback may specifically include:

obtaining movement amplitude information corresponding to the upper body contact, the movement amplitude information being configured for describing movement amplitude magnitude of the upper body contact;

determining vibration strength information based on the movement amplitude information, the vibration strength information being positively correlated with the movement amplitude information; and controlling the head display device and the ring device to trigger vibration feedback based on the vibration strength information.

In one or more embodiments, a manner of providing corresponding force feedback according to movement amplitude is described. As can be learned from the foregoing embodiments, an inertial measurement unit (IMU) may be further built in the VR device. The IMU includes a gyroscope and an accelerometer. The accelerometer is configured to detect acceleration signals of an object on three independent axes of a carrier coordinate system, and integrate unidirectional acceleration to obtain a directional speed.

Specifically, an example is used in which the first virtual object triggers upper body contact to the second virtual object. The first object (that is, a real user) wears a ring device (that is, a VR ring device). Therefore, the first virtual object is controlled, through the ring device, to tap the upper body of the second virtual object. In this way, a movement speed of the hand of the first object may be measured through an IMU built in the ring device. Different movement speeds correspond to different movement amplitude information. For ease of understanding, refer to Table 1. Table 1 shows a correspondence between a movement speed, movement amplitude information, and vibration strength information.

TABLE 1

| Movement speed | Movement amplitude information | Vibration strength information |
|---|---|---|
| 0 m/s < v ≤ 5 m/s | Small amplitude | Light vibration |
| 5 m/s < v ≤ 8 m/s | Medium amplitude | Medium vibration |
| 8 m/s < v | Large amplitude | Heavy vibration |

"v" represents a hand movement speed of an action trigger. It can be learned that, when the movement speed of the hand of the first object is greater, the corresponding movement amplitude is greater, and correspondingly, the intensity of the vibration that can be sensed by the action recipient (that is, the second object) is greater. If the first object controls the first virtual object to touch a shoulder of the second virtual object at a speed of 3 m/s, the second object may feel a light vibration through the head display device and the ring device.

The movement speed in Table 1 may alternatively be a movement speed of another body area, for example, an elbow. The foregoing example uses a hand movement speed as an example for description, but this is not to be understood as a limitation on this disclosure.

In actual application, a camera (for example, a depth camera or a binocular camera) may also be used to sense distance information of a picture, and then a corresponding algorithm is used to identify movement amplitude of a real user. Alternatively, the movement amplitude of the real user may be detected in other manners. This is not limited herein.

Subsequently, the embodiments of this disclosure provide a manner of providing corresponding force feedback according to movement amplitude. Through the foregoing manner, a user may control, through an action of the user, a virtual object to perform a corresponding action in a virtual scene. Based on this, movement amplitude information of the upper body contact may be determined by detecting a movement speed of the real user. In this way, a VR kit is controlled to trigger vibration feedback based on corresponding vibration strength information. Therefore, a real state between users is better simulated, allowing the VR interactive experience to be more immersive and realistic.

In one embodiment, based on the foregoing embodiments corresponding to FIG. 4, in another embodiment provided in the embodiments of this disclosure, the VR kit includes a head display device. The controlling a VR kit to trigger somatosensory feedback in response to an interactive operation triggered by the first virtual object for the second virtual object may specifically include:

controlling the head display device to trigger vibration feedback in response to head contact triggered by the first virtual object for the second virtual object.

In one or more embodiments, a manner of triggering head feedback based on head contact is described. As can be learned from the foregoing embodiments, in the VR scene, triggering of an interactive action between virtual objects is also supported. Specifically, the first virtual object may touch a head of the second virtual object, that is, head contact is triggered for the second virtual object. Based on this, a head display device worn by the second object triggers vibration feedback.

Figure 16:
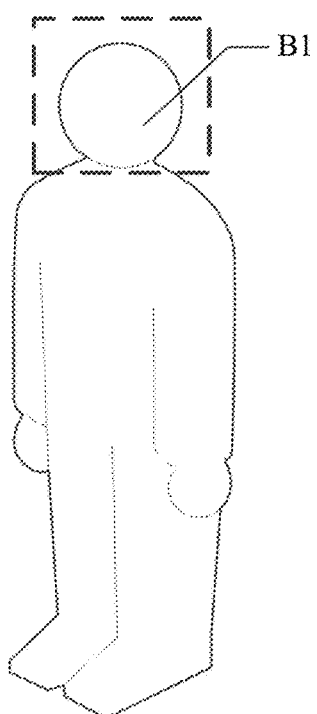
FIG. 16 is a schematic diagram of a head of a virtual object according to an embodiment of this disclosure.

Specifically, for case of understanding, referring to FIG. 16, FIG. 16 is a schematic diagram of a head of a virtual object according to an embodiment of this disclosure. As shown in the figure, BI is used for indicating the head of the virtual object. The head may be understood as a part above the neck. An example is used in which both the first virtual object and the second virtual object are character images. If the first virtual object touches a head of the second virtual object, this may be determined as head interaction, that is, head contact.

Subsequently, the embodiments of this disclosure provide a manner of triggering head feedback based on head contact. Through the foregoing manner, in the VR scene, head contact interaction between virtual objects is supported, thereby enriching the diversity of VR tactile feedback and the functionality of interaction carriers.

In one embodiment, based on the foregoing embodiments corresponding to FIG. 4, in another embodiment provided in the embodiments of this disclosure, the responding to head contact triggered by the first virtual object for the second virtual object may specifically include:

responding to a head accessory wearing operation triggered by the first virtual object for the second virtual object;

responding to a head accessory removal operation triggered by the first virtual object for the second virtual object;

responding to a touch operation triggered by the first virtual object on a face of the second virtual object; or responding to a touch operation triggered by the first virtual object on a neck of the second virtual object.

In one or more embodiments, a manner of responding to head contact in a VR scene is described. As can be learned from the foregoing embodiments, the VR scene supports a real user in creating a virtual object belonging to the real user and controlling the virtual object to perform interaction in the VR scene. Descriptions are provided below with reference to different interactive scenarios.

For example, for case of understanding, referring to FIG. 17, FIG. 17 is a schematic diagram of responding to a head accessory wearing operation based on a VR scene according to an embodiment of this disclosure. As shown in (A) of FIG. 17, a first object controls a first virtual object, and a second object controls a second virtual object. The first virtual object walks towards the second virtual object with a headset, and prepares to put the headset on the second virtual object. As shown in (B) of FIG. 17, the first virtual object puts a headset on the second virtual object. In this process, the first virtual object touches a head of the second virtual object. Based on this, a head display device worn by the second object triggers vibration feedback.

For example, for ease of understanding, referring to FIG. 18, FIG. 18 is a schematic diagram of responding to a head accessory removal operation based on a VR scene according to an embodiment of this disclosure. As shown in (A) of FIG. 18, a first object controls a first virtual object, and a second object controls a second virtual object. The second virtual object wears glasses, and the first virtual object is prepared to take off the glasses for the second virtual object. As shown in (B) of FIG. 18, the first virtual object takes off the glasses for the second virtual object. In this process, the first virtual object touches a head of the second virtual object. Based on this, a head display device worn by the second object triggers vibration feedback.

Figure 19:
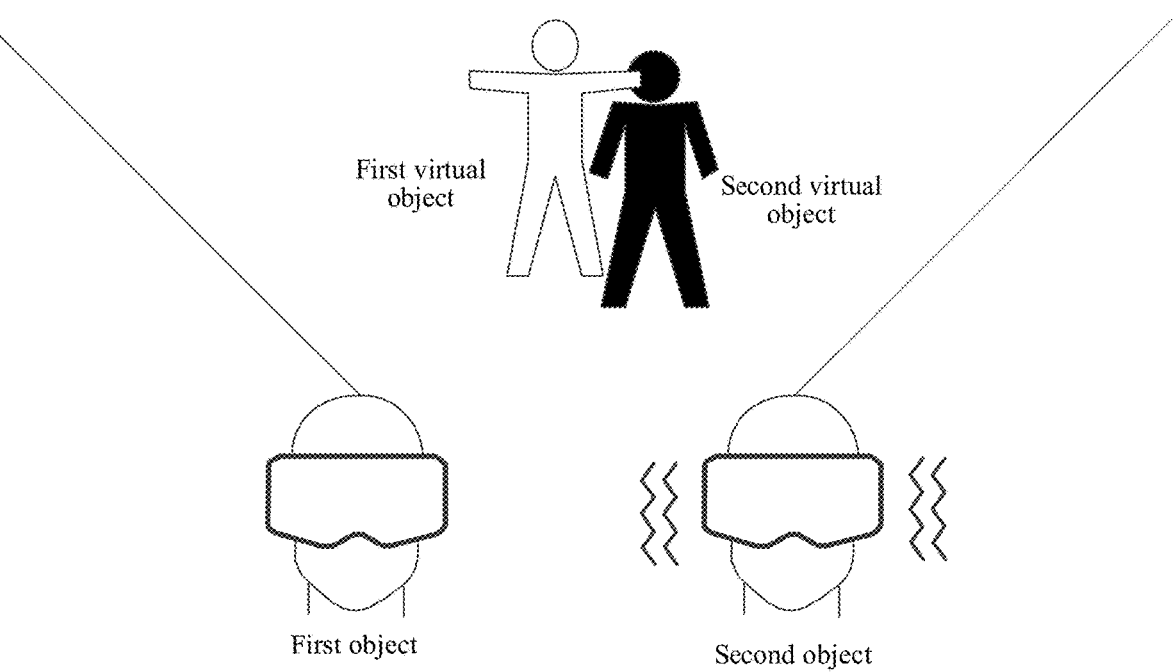
FIG. 19 is a schematic diagram of responding to a face touch operation based on a VR scene according to an embodiment of this disclosure.

For example, for ease of understanding, referring to FIG. 19, FIG. 19 is a schematic diagram of responding to a face touch operation based on a VR scene according to an embodiment of this disclosure. As shown in the figure, a first object controls a first virtual object, and a second object controls a second virtual object. The first object controls the first virtual object to walk towards the second virtual object, and then touches a cheek area of the second virtual object. That is, the first virtual object triggers a touch operation on a face area of the second virtual object. Based on this, a head display device worn by the second object triggers vibration feedback.

Figure 20:
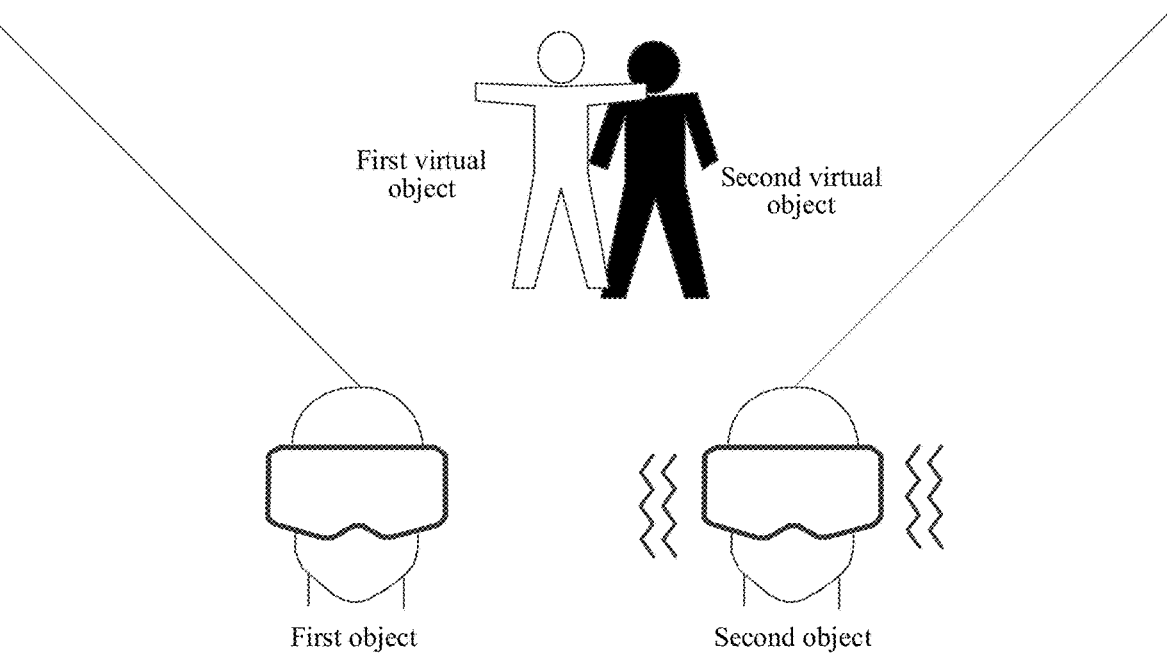
FIG. 20 is a schematic diagram of responding to a neck touch operation based on a VR scene according to an embodiment of this disclosure.

For example, for ease of understanding, referring to FIG. 20, FIG. 20 is a schematic diagram of responding to a neck touch operation based on a VR scene according to an embodiment of this disclosure. As shown in the figure, a first object controls a first virtual object, and a second object controls a second virtual object. The first object controls the first virtual object to walk towards the second virtual object, and then touches a neck area of the second virtual object. That is, the first virtual object triggers a touch operation on the neck area of the second virtual object. Based on this, a head display device worn by the second object triggers vibration feedback.

A quantity of virtual objects, images of the virtual objects, and the like shown in each of FIG. 17 to FIG. 20 are all schematic and are not to be construed as a limitation on this disclosure.

The vibration feedback provided by the head display device may be one vibration, or may be several continuous vibrations. The head accessories in this disclosure include but are not limited to a headset, glasses, a hat, hair accessories, and the like.

Subsequently, the embodiments of this disclosure provide a manner of responding to head contact in a VR scene. Through the foregoing manner, in the VR scene, a real user may sense, through a VR kit, a head contact operation triggered by another user. This enriches the diversity of VR tactile feedback and the functionality of interaction carriers, improves the realism of the interaction process, and allows the user to be immersive.

In one embodiment, based on the foregoing embodiments corresponding to FIG. 4, in another embodiment provided in the embodiments of this disclosure, the controlling the head display device to trigger vibration feedback may specifically include:

> obtaining movement amplitude information corresponding to the head contact, the movement amplitude information being configured for describing movement amplitude magnitude of the head contact;
>
> determining vibration strength information based on the movement amplitude information, the vibration strength information being positively correlated with the movement amplitude information; and
>
> controlling the head display device to trigger vibration feedback based on the vibration strength information.

In one or more embodiments, a manner of providing corresponding force feedback according to movement amplitude is described. As can be learned from the foregoing embodiments, an IMU may be built in the VR device, and a movement speed of the VR device may be further detected through the IMU. Alternatively, a camera is used to sense distance information of a picture, and a corresponding algorithm is used to identify movement amplitude of a real user. Alternatively, the movement amplitude of the real user may be detected in other manners. This is not limited herein.

Specifically, an example is used in which the first virtual object triggers head contact to the second virtual object. The first object (that is, a real user) wears a ring device (that is, a VR ring device). Therefore, the first virtual object is controlled, through the ring device, to tap a head of the second virtual object. In this way, a movement speed of the hand of the first object may be measured through an IMU built in the ring device. Different movement speeds correspond to different movement amplitude information. For ease of understanding, refer to Table 1 again. If the first object controls the first virtual object to touch the head of the second virtual object at a speed of 6 m/s, the second object may feel a medium vibration through the head display device.

Subsequently, the embodiments of this disclosure provide a manner of providing corresponding force feedback according to movement amplitude. Through the foregoing manner, a user may control, through an action of the user, a virtual object to perform a corresponding action in a virtual scene (for example, a combat VR game). Based on this, movement amplitude information of the head contact may be determined by detecting a movement speed of the real user. In this way, a VR kit is controlled to trigger vibration feedback based on corresponding vibration strength information. Therefore, a real state between users is better simulated, allowing the VR interactive experience to be more immersive and realistic.

In one embodiment, based on the foregoing embodiments corresponding to FIG. 4, in another embodiment provided in the embodiments of this disclosure, the VR kit includes a ring device. Correspondingly, the controlling a VR kit to trigger somatosensory feedback in response to an interactive operation triggered by the first virtual object for the second virtual object may specifically include:

> controlling the ring device to trigger vibration feedback in response to hand contact triggered by the first virtual object for the second virtual object.

In one or more embodiments, a manner of triggering hand feedback based on hand contact is described. As can be learned from the foregoing embodiments, in the VR scene, triggering of an interactive action between virtual objects is also supported. Specifically, the first virtual object may touch a hand of the second virtual object, that is, hand contact is triggered for the second virtual object. Based on this, a ring device worn by the second object triggers vibration feedback.

Figure 21:
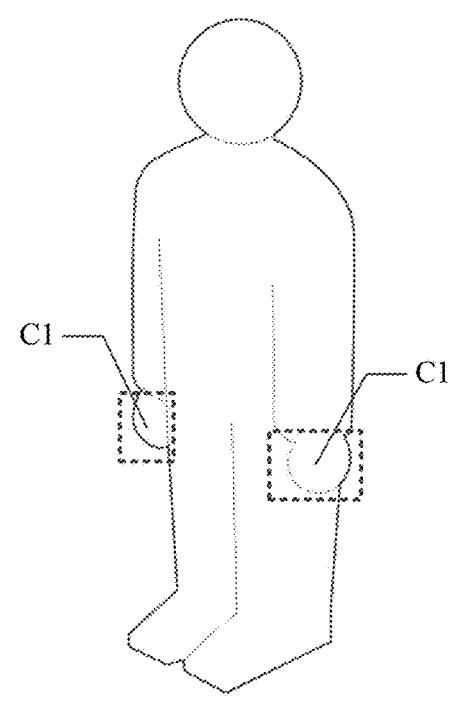
FIG. 21 is a schematic diagram of a hand of a virtual object according to an embodiment of this disclosure.

Specifically, for case of understanding, referring to FIG. 21, FIG. 21 is a schematic diagram of a hand of a virtual object according to an embodiment of this disclosure. As shown in the figure, C1 is used for indicating the hand of the virtual object. The hand may be understood as a part consisting of fingers, a hand back, and a palm. An example is used in which both the first virtual object and the second virtual object are character images. If a hand of the first virtual object touches the hand of the second virtual object, this may be determined as hand interaction, that is, hand contact.

Subsequently, the embodiments of this disclosure provide a manner of triggering hand feedback based on hand contact. Through the foregoing manner, in the VR scene, body interaction between virtual objects is supported, thereby enriching the diversity of VR tactile feedback and the functionality of interaction carriers.

In one embodiment, based on the foregoing embodiments corresponding to FIG. 4, in another embodiment provided in the embodiments of this disclosure, the responding hand contact triggered by the first virtual object for the second virtual object may specifically include:

> responding to a handshake operation triggered by the first virtual object for the second virtual object;
>
> responding to a high-five operation triggered by the first virtual object for the second virtual object; or
>
> responding to a hand touch operation triggered by the first virtual object for the second virtual object.

In one or more embodiments, a manner of responding to hand contact in a VR scene is described. As can be learned from the foregoing embodiments, the VR scene supports a real user in creating a virtual object belonging to the real user and controlling the virtual object to perform interaction in the VR scene. Descriptions are provided below with reference to different interactive scenarios.

Figure 22:
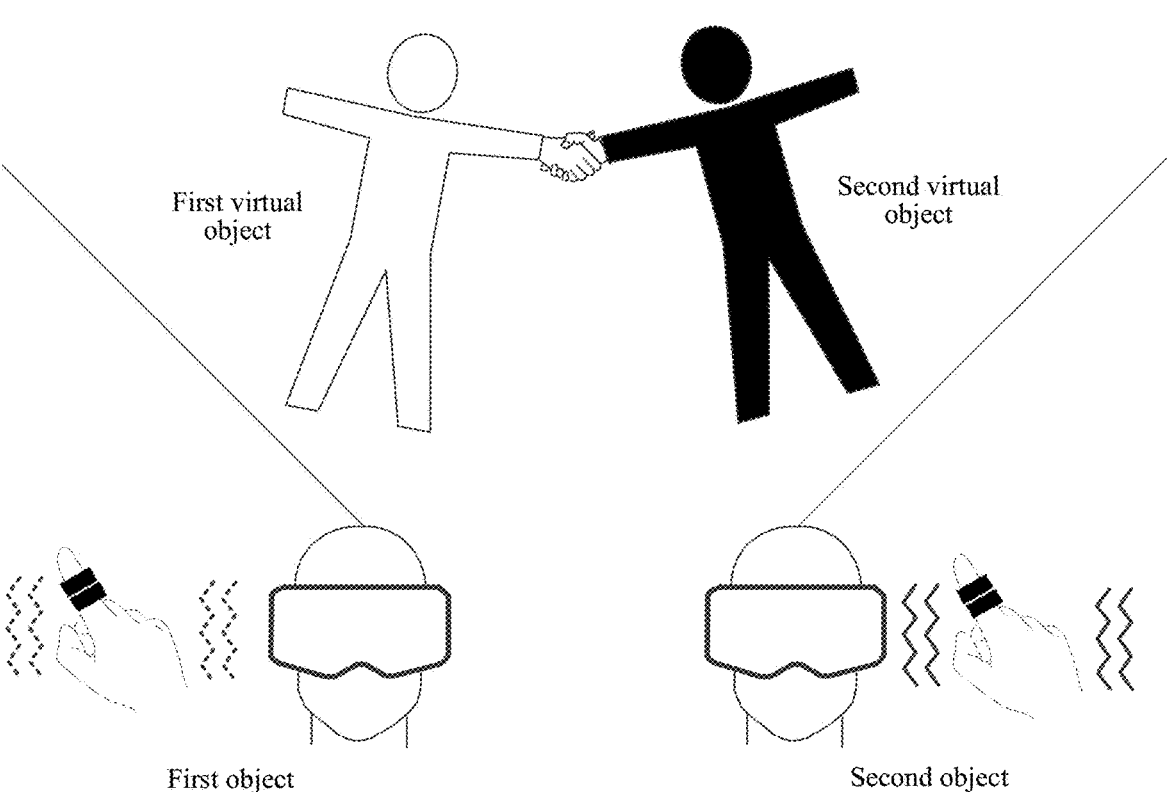
FIG. 22 is a schematic diagram of responding to a handshake operation based on a VR scene according to an embodiment of this disclosure.

For example, for case of understanding, referring to FIG. 22, FIG. 22 is a schematic diagram of responding to a handshake operation based on a VR scene according to an embodiment of this disclosure. As shown in the figure, a first object controls a first virtual object, and a second object controls a second virtual object. The first object controls the first virtual object to shake hands with the second virtual object. That is, the first virtual object triggers a handshake operation on the second virtual object. Based on this, a ring device worn by the second object triggers vibration feedback. In one embodiment, a ring device worn by the first object may also trigger vibration feedback.

Figure 23:
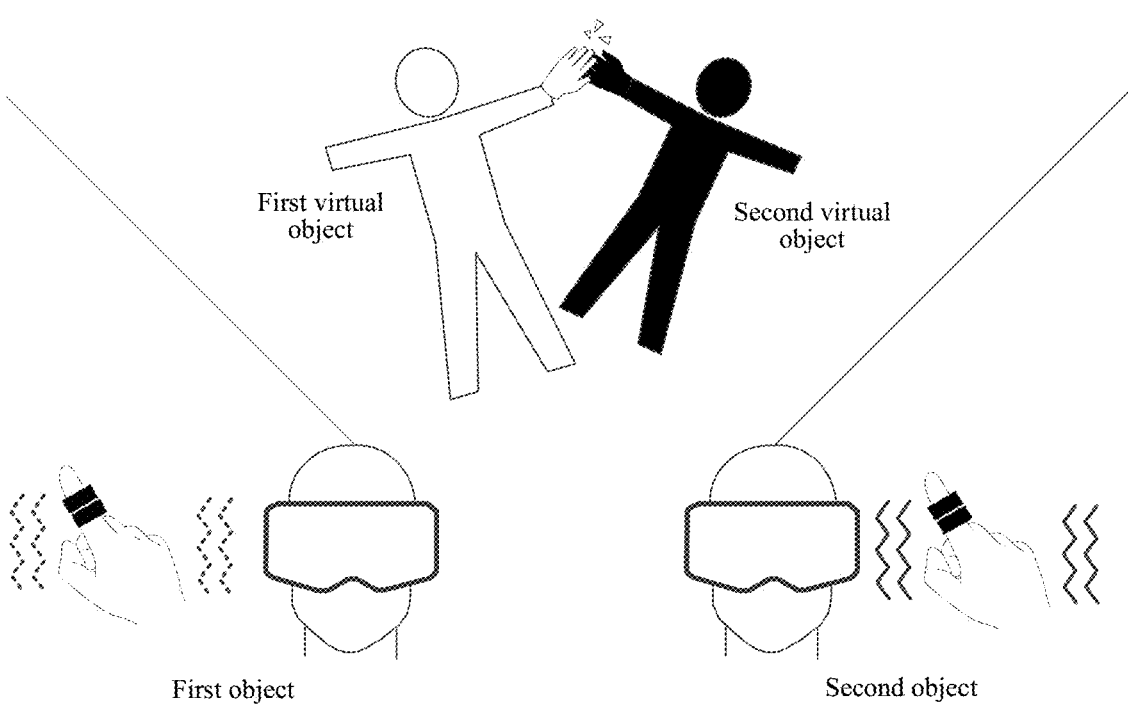
FIG. 23 is a schematic diagram of responding to a high-five operation based on a VR scene according to an embodiment of this disclosure.

For example, for case of understanding, referring to FIG. 23, FIG. 23 is a schematic diagram of responding to a high-five operation based on a VR scene according to an embodiment of this disclosure. As shown in the figure, a first object controls a first virtual object, and a second object controls a second virtual object. The first object controls the first virtual object to give a high-five to the second virtual object. That is, the first virtual object triggers a high-five operation on the second virtual object. Based on this, a ring device worn by the second object triggers vibration feedback. In one embodiment, a ring device worn by the first object may also trigger vibration feedback.

Figure 24:
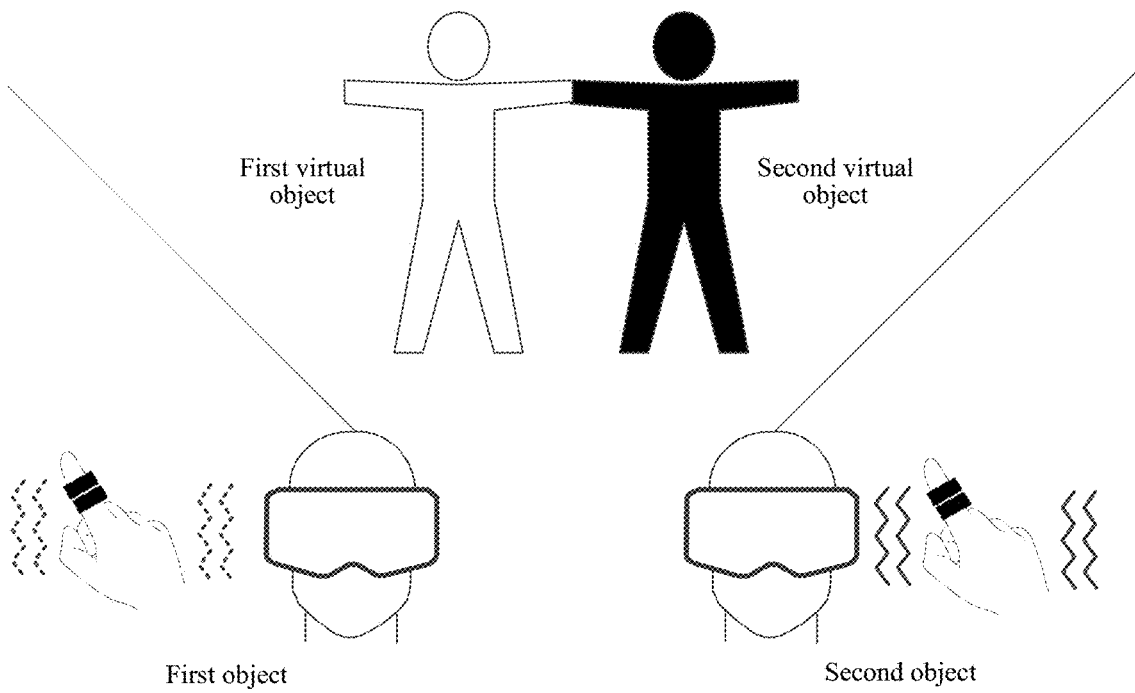
FIG. 24 is a schematic diagram of responding to a hand touch operation based on a VR scene according to an embodiment of this disclosure.

For example, for case of understanding, referring to FIG. 24, FIG. 24 is a schematic diagram of responding to a hand touch operation based on a VR scene according to an embodiment of this disclosure. As shown in the figure, a first object controls a first virtual object, and a second object controls a second virtual object. The first object controls the first virtual object to touch a hand of the second virtual object. That is, the first virtual object triggers a hand touch operation for the second virtual object. Based on this, a ring device worn by the second object triggers vibration feedback. In one embodiment, a ring device worn by the first object may also trigger vibration feedback.

A quantity of virtual objects, images of the virtual objects, and the like shown in each of FIG. 22 to FIG. 24 are all schematic and are not to be construed as a limitation on this disclosure.

The vibration feedback provided by the ring device may be one vibration, or may be several continuous vibrations. The hand touch in this disclosure includes, but is not limited to, touching a palm, touching a back of a hand, touching a finger, and the like.

Subsequently, the embodiments of this disclosure provide a manner of responding to hand contact in a VR scene. Through the foregoing manner, in the VR scene, a real user may sense, through a VR kit, a hand contact operation triggered by another user. This enriches the diversity of VR tactile feedback and the functionality of interaction carriers, improves the realism of the interaction process, and allows the user to be immersive.

In one embodiment, based on the foregoing embodiments corresponding to FIG. 4, in another embodiment provided in the embodiments of this disclosure, the controlling the ring device to trigger vibration feedback may specifically include:

obtaining movement amplitude information corresponding to the hand contact, the movement amplitude information being configured for describing movement amplitude magnitude of the hand contact;

determining vibration strength information based on the movement amplitude information, the vibration strength information being positively correlated with the movement amplitude information; and controlling the ring device to trigger vibration feedback based on the vibration strength information.

In one or more embodiments, a manner of providing corresponding force feedback according to movement amplitude is described. As can be learned from the foregoing embodiments, an IMU may be built in the VR device, and a movement speed of the VR device may be further detected through the IMU. Alternatively, a camera is used to sense distance information of a picture, and a corresponding algorithm is used to identify movement amplitude of a real user. Alternatively, the movement amplitude of the real user may be detected in other manners. This is not limited herein.

Specifically, an example is used in which the first virtual object triggers hand contact to the second virtual object. The first object (that is, a real user) wears a ring device (that is, a VR ring device). Therefore, the first virtual object is controlled, through the ring device, to tap the back of the hand of the second virtual object. In this way, a movement speed of the hand of the first object may be measured through an IMU built in the ring device. Different movement speeds correspond to different movement amplitude information. For ease of understanding, refer to Table 1 again. If the first object controls the first virtual object to touch the hand of the second virtual object at a speed of 7 m/s, the second object may feel a medium vibration through the ring device.

Subsequently, the embodiments of this disclosure provide a manner of providing corresponding force feedback according to movement amplitude. Through the foregoing manner, a user may control, through an action of the user, a virtual object to perform a corresponding action in a virtual scene. Based on this, movement amplitude information of the hand contact may be determined by detecting a movement speed of the real user. In this way, a VR kit is controlled to trigger vibration feedback based on corresponding vibration strength information. Therefore, a real state between users is better simulated, allowing the VR interactive experience to be more immersive and realistic.

In one embodiment, based on the foregoing embodiments corresponding to FIG. 4, in another embodiment provided in the embodiments of this disclosure, the VR kit may include a glove device. Correspondingly, the controlling a VR kit to trigger somatosensory feedback in response to an interactive operation triggered by the first virtual object for the second virtual object may specifically include:

controlling the glove device to trigger heat generation feedback in response to a contact operation on a first article when the first virtual object transfers the first article to the second virtual object.

In one or more embodiments, a feedback manner of transferring a thermal object in a VR scene is described. As can be learned from the foregoing embodiments, the VR scene supports a real user in creating a virtual object belonging to the real user and controlling the virtual object to perform interaction in the VR scene. An example in which the first object is a hot water glass is used for description below.

Specifically, for case of understanding, referring to FIG. 25, FIG. 25 is a schematic diagram of responding to a first article transfer operation based on a VR scene according to an embodiment of this disclosure. As shown in (A) of FIG. 25, a first object controls a first virtual object, and a second object controls a second virtual object. The first virtual object walks towards the second virtual object with a glass of hot water, and prepares to hand the hot water glass to the second virtual object. As shown in (B) of FIG. 25, the first virtual object hands the hot water glass to the second virtual object. When the hot water glass touches a hand of the second virtual object, a glove device worn by the second object triggers heat generation feedback. For example, the temperature of the glove device increases by 5 degrees Centigrade.

A quantity of virtual objects, images of the virtual objects, and the like shown in FIG. 25 are all schematic and are not to be construed as a limitation on this disclosure.

The glove device may provide not only thermal feedback, but also vibration feedback, and the like. The first article includes but is not limited to hot water, a hot towel, hot soup, and the like.

Subsequently, the embodiments of this disclosure provide a feedback manner of transferring a thermal article in a VR scene. Through the foregoing manner, in the VR scene, a real user may sense, through a VR kit, a thermal article transferred by another user, thereby triggering thermal feedback. This enriches the diversity of VR tactile feedback and the functionality of interaction carriers, allowing the user to be immersive, thereby helping improve the fun of interactive experience.

In one embodiment, based on the foregoing embodiments corresponding to FIG. 4, in another embodiment provided in the embodiments of this disclosure, the VR kit may include a glove device. Correspondingly, the controlling a VR kit to trigger somatosensory feedback in response to an interactive operation triggered by the first virtual object for the second virtual object may specifically include:

controlling the glove device to trigger temperature reduction feedback in response to a contact operation on a second article when the first virtual object transfers the second article to the second virtual object.

In one or more embodiments, a feedback manner for transferring an ice-cold article in a VR scene is described. As can be learned from the foregoing embodiments, the VR scene supports a real user in creating a virtual object belonging to the real user and controlling the virtual object to perform interaction in the VR scene. An example in which the second article is ice cream is used for description below.

Figure 26:
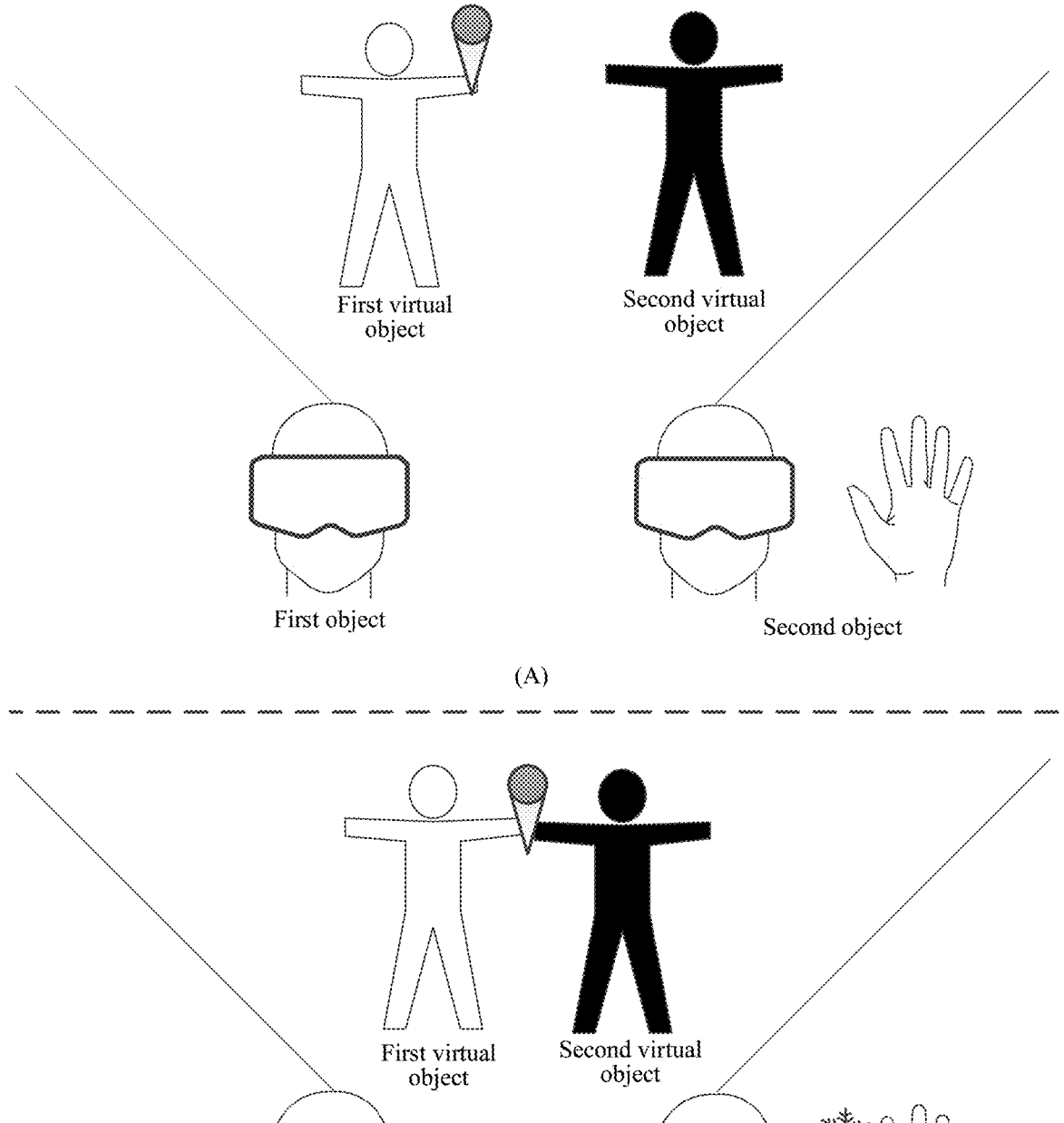
FIG. 26 is a schematic diagram of responding to a second article transfer operation based on a VR scene according to an embodiment of this disclosure.

Specifically, for case of understanding, referring to FIG. 26, FIG. 26 is a schematic diagram of responding to a second article transfer operation based on a VR scene according to an embodiment of this disclosure. As shown in (A) of FIG. 26, a first object controls a first virtual object, and a second object controls a second virtual object. The first virtual object walks towards the second virtual object with an ice cream, and prepares to hand the ice cream to the second virtual object. As shown in (B) of FIG. 26, the first virtual object hands the ice cream to the second virtual object. When the ice cream touches a hand of the second virtual object, a glove device worn by the second object triggers temperature reduction feedback. For example, the temperature of the glove device decreases by 5 degrees Centigrade.

A quantity of virtual objects, images of the virtual objects, and the like shown in FIG. 26 are all schematic and are not to be construed as a limitation on this disclosure.

The glove device may provide not only temperature reduction feedback, but also vibration feedback, and the like. The second article includes but is not limited to ice cream, ice cubes, and the like.

Subsequently, the embodiments of this disclosure provide a feedback manner of transferring an ice-cold article in a VR scene. Through the foregoing manner, in the VR scene, a real user may sense, through a VR kit, an ice-cold article transferred by another user, thereby triggering ice feeling feedback. This enriches the diversity of VR tactile feedback and the functionality of interaction carriers, allowing the user to be immersive, thereby helping improve the fun of interactive experience.

In one embodiment, based on the foregoing embodiments corresponding to FIG. 4, in another embodiment provided in the embodiments of this disclosure, the VR kit may include a head display device. Correspondingly, the controlling a VR kit to trigger somatosensory feedback in response to an interactive operation triggered by the first virtual object for the second virtual object may specifically include:

controlling the head display device to trigger airflow feedback in response to a whispering operation triggered by the first virtual object for the second virtual object.

In one or more embodiments, a manner of responding to a whisper in a VR scene is described. As can be learned from the foregoing embodiments, the VR scene supports a real user in creating a virtual object belonging to the real user and controlling the virtual object to perform interaction in the VR scene. Descriptions are provided below with reference to interactive scenarios.

Figure 27:
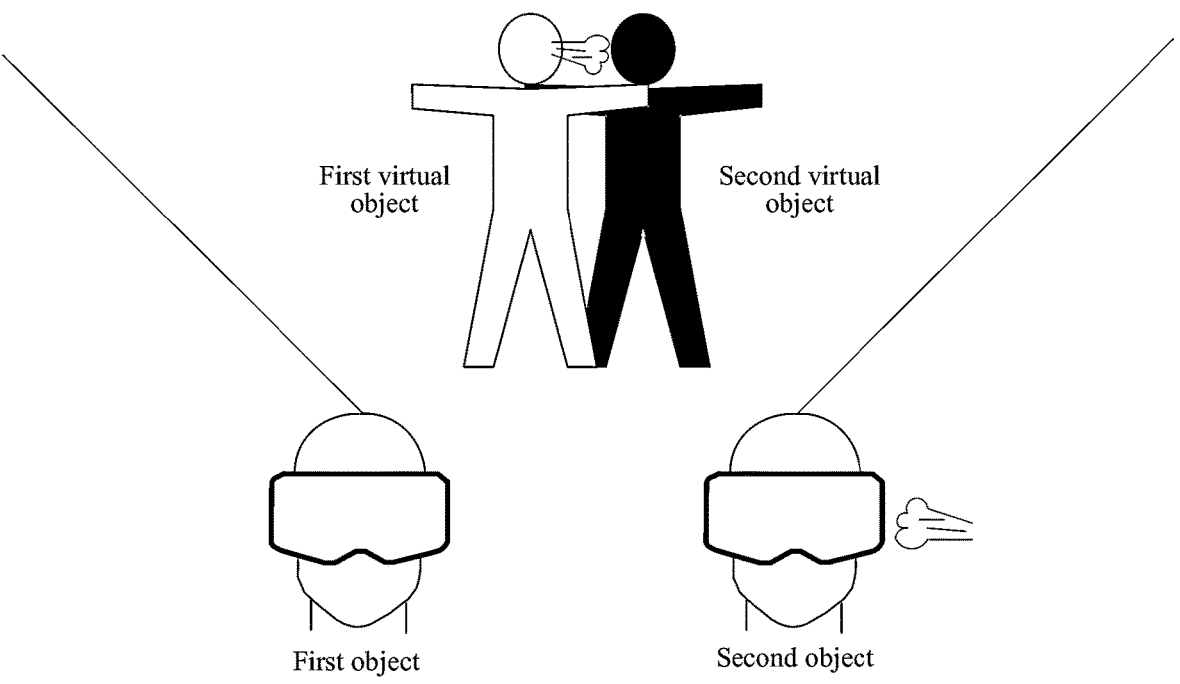
FIG. 27 is a schematic diagram of responding to a whispering operation based on a VR scene according to an embodiment of this disclosure.

For example, for ease of understanding, referring to FIG. 27, FIG. 27 is a schematic diagram of responding to a whispering operation based on a VR scene according to an embodiment of this disclosure. As shown in the figure, a first object controls a first virtual object, and a second object controls a second virtual object. The first object controls the first virtual object to whisper to the second virtual object. That is, the first virtual object triggers a whispering operation for the second virtual object. Based on this, a head display device worn by the second object triggers airflow feedback to simulate an effect of whispering.

A quantity of virtual objects, images of the virtual objects, and the like shown in FIG. 27 are all schematic and are not to be construed as a limitation on this disclosure.

The airflow feedback provided by the head display device may be once or several times in succession.

Subsequently, the embodiments of this disclosure provide a manner of responding to a whisper in a VR scene. Through the foregoing manner, in the VR scene, a real user may sense, through a VR kit, a whispering operation triggered by another user. This enriches the diversity of VR tactile feedback and the functionality of interaction carriers, improves the realism of the interaction process, and allows the user to be immersive.

In one embodiment, based on the foregoing embodiments corresponding to FIG. 4, in another embodiment provided in the embodiments of this disclosure, the VR kit may include a belt device. Correspondingly, the controlling a VR kit to trigger somatosensory feedback in response to an interactive operation triggered by the first virtual object for the second virtual object may specifically include:

controlling the belt device to trigger contraction feedback in response to a hug operation triggered by the first virtual object for the second virtual object.

In one or more embodiments, a manner of responding to a hug in a VR scene is described. As can be learned from the foregoing embodiments, the VR scene supports a real user in creating a virtual object belonging to the real user and controlling the virtual object to perform interaction in the VR scene. Descriptions are provided below with reference to interactive scenarios.

Figure 28:
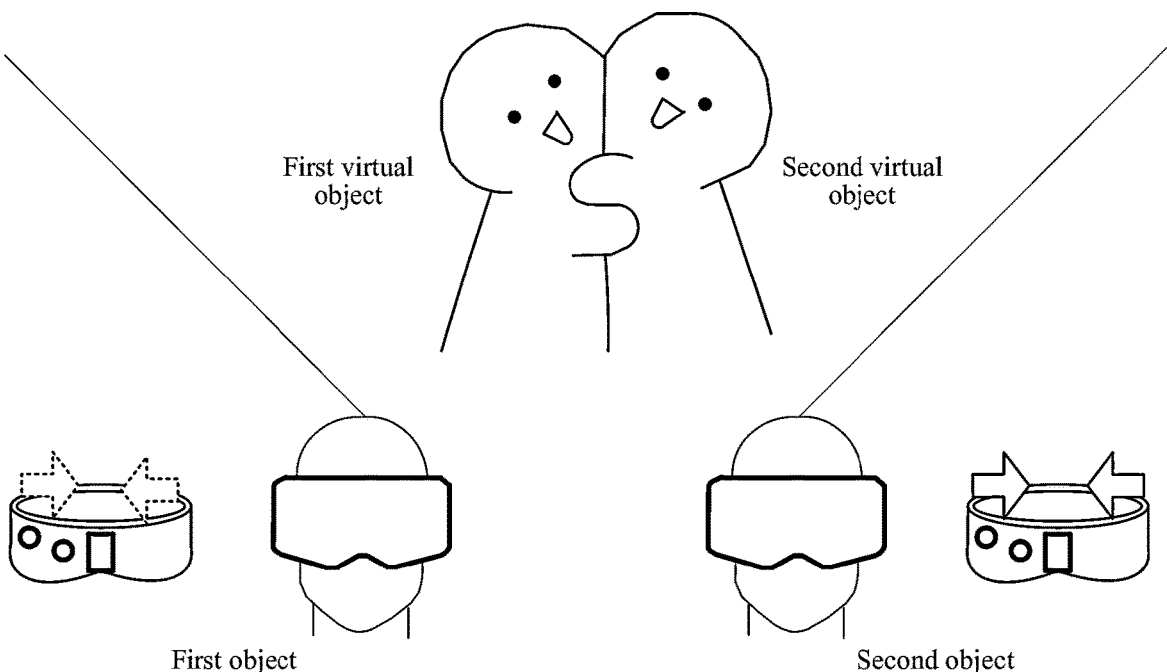
FIG. 28 is a schematic diagram of responding to a hug operation based on a VR scene according to an embodiment of this disclosure.

For example, for ease of understanding, referring to FIG. 28, FIG. 28 is a schematic diagram of responding to a hug operation based on a VR scene according to an embodiment of this disclosure. As shown in the figure, a first object controls a first virtual object, and a second object controls a second virtual object. The first object controls the first virtual object to hug the second virtual object. That is, the first virtual object triggers a hug operation for the second virtual object. Based on this, a belt device worn by the second object triggers inward contraction feedback. In one embodiment, a belt device worn by the first object also triggers inward contraction feedback.

A quantity of virtual objects, images of the virtual objects, and the like shown in FIG. 28 are all schematic and are not to be construed as a limitation on this disclosure.

Subsequently, the embodiments of this disclosure provide a manner of responding to a hug in a VR scene. Through the foregoing manner, in the VR scene, a real user may sense, through a VR kit, a hug operation triggered by another user. This enriches the diversity of VR tactile feedback and the functionality of interaction carriers, improves the realism of the interaction process, and allows the user to be immersive.

In one embodiment, based on the foregoing embodiments corresponding to FIG. 4, in another embodiment provided in the embodiments of this disclosure, the VR kit may include a shoe device. Correspondingly, the controlling a VR kit to trigger somatosensory feedback in response to an interactive operation triggered by the first virtual object for the second virtual object may specifically include:

responding to a ball passing operation triggered by the first virtual object to the second virtual object; and controlling the shoe device to trigger vibration feedback when a target ball comes into contact with a lower body of the second virtual object.

In one or more embodiments, a feedback manner of simulating ball passing in a VR scene is described. As can be learned from the foregoing embodiments, the VR scene supports a real user in creating a virtual object belonging to the real user and controlling the virtual object to perform activities in the VR scene. Descriptions are provided below with reference to interactive scenarios.

Figure 29:
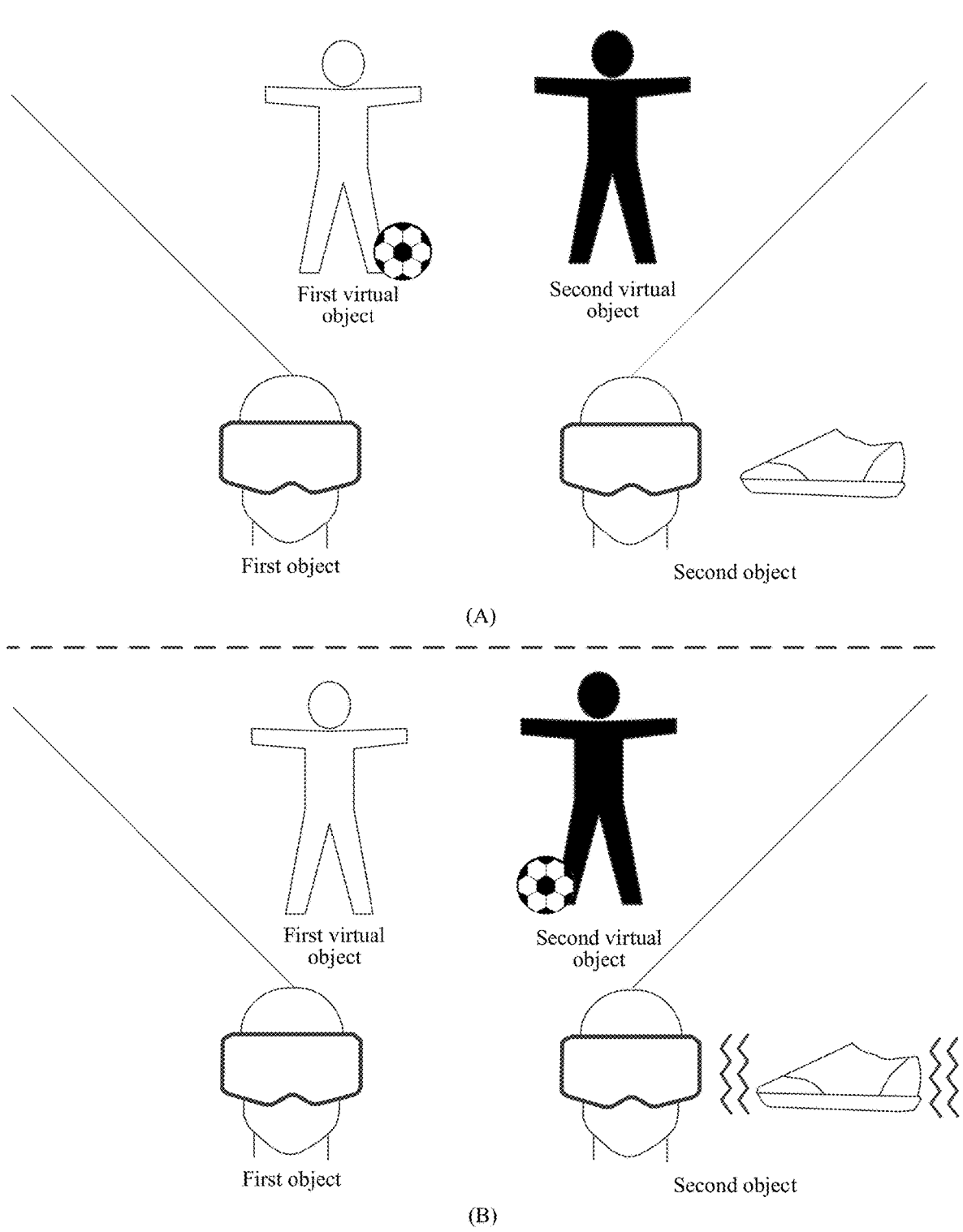
FIG. 29 is a schematic diagram of responding to a ball passing operation based on a VR scene according to an embodiment of this disclosure.

Specifically, for case of understanding, referring to FIG. 29, FIG. 29 is a schematic diagram of responding to a ball passing operation based on a VR scene according to an embodiment of this disclosure. As shown in (A) of FIG. 29, a first object controls a first virtual object, and a second object controls a second virtual object. The first virtual object prepares to pass a football at his/her feet to the second virtual object. As shown in (B) of FIG. 29, when the football touches a lower body of the second virtual object, a shoe device worn by the second object triggers vibration feedback.

A quantity of virtual objects, images of the virtual objects, and the like shown in FIG. 29 are all schematic and are not to be construed as a limitation on this disclosure.

The vibration feedback provided by the shoe device may be one vibration, or may be several continuous vibrations.

Subsequently, the embodiments of this disclosure provide a feedback manner of simulating ball passing in a VR scene. Through the foregoing manner, in the VR scene, a real user may sense, through a VR kit, a ball passing operation triggered by another user. This enriches the diversity of VR tactile feedback and the functionality of interaction carriers. In addition, in combination with the VR scene, more diversified interactive manners are provided, allowing the user to be immersive.

Figure 30:
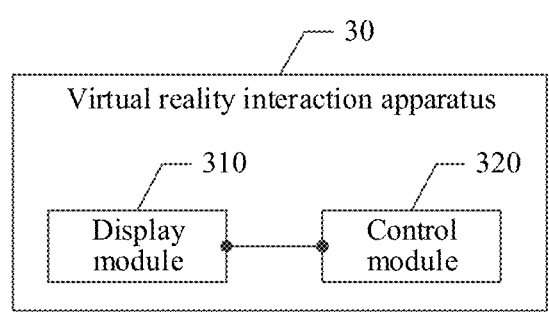
FIG. 30 is a schematic diagram of a VR interaction apparatus according to an embodiment of this disclosure.

The following describes in detail a VR interaction apparatus in this disclosure. FIG. 30 is a schematic embodiment diagram of a VR interaction apparatus according to an embodiment of this disclosure. The VR interaction apparatus 30 includes:

a display module 310, configured to display at least two virtual objects in a VR scene, the at least two virtual objects including a first virtual object and a second virtual object, the first virtual object being a virtual object controlled by a first object, and the second virtual object being a virtual object controlled by a second object; and a control module 320, configured to control a VR kit to trigger somatosensory feedback in response to an interactive operation triggered by the first virtual object for the second virtual object, the VR kit including at least one VR device worn by the second object.

In one embodiment, based on the foregoing embodiment corresponding to FIG. 30, in another embodiment of the VR interaction apparatus 30 provided in the embodiments of this disclosure, the VR kit includes a head display device. The control module 320 is specifically configured to control the VR kit to trigger the somatosensory feedback in at least one of the following manners:

controlling the head display device to trigger vibration feedback in response to a session message transmitted by the first virtual object for the second virtual object;

controlling the head display device to trigger vibration feedback in response to a non-contact interactive message transmitted by the first virtual object for the second virtual object;

controlling the head display device to trigger vibration feedback in response to an email transmitted by the first virtual object, a recipient of the email including the second virtual object;

controlling the head display device to trigger vibration feedback in response to an electronic file transmitted by the first virtual object for the second virtual object;

controlling the head display device to trigger vibration feedback in response to a team invitation message transmitted by the first virtual object for the second virtual object; or controlling the head display device to trigger vibration feedback in response to a roll call prompt message transmitted by the first virtual object for the second virtual object.

In one embodiment, based on the foregoing embodiment corresponding to FIG. 30, in another embodiment of the VR interaction apparatus 30 provided in the embodiments of this disclosure, the VR kit includes a head display device and a ring device.

The control module 320 is specifically configured to control the head display device and the ring device to trigger vibration feedback in response to upper body contact triggered by the first virtual object for the second virtual object.

In one embodiment, based on the foregoing embodiment corresponding to FIG. 30, in another embodiment of the VR interaction apparatus 30 provided in the embodiments of this disclosure, the control module 320 is specifically configured to respond to a touch operation triggered by the first virtual object on a shoulder area of the second virtual object;

respond to a touch operation triggered by the first virtual object on an arm area of the second virtual object;

respond to a touch operation triggered by the first virtual object on a back area of the second virtual object; or respond to a touch operation triggered by the first virtual object on a waist area of the second virtual object.

In one embodiment, based on the foregoing embodiment corresponding to FIG. 30, in another embodiment of the VR interaction apparatus 30 provided in the embodiments of this disclosure, the control module 320 is specifically configured to obtain movement amplitude information corresponding to the upper body contact, the movement amplitude information being configured for describing movement amplitude magnitude of the upper body contact;

determine vibration strength information based on the movement amplitude information, the vibration strength information being positively correlated with the movement amplitude information; and control the head display device and the ring device to trigger vibration feedback based on the vibration strength information.

In one embodiment, based on the foregoing embodiment corresponding to FIG. 30, in another embodiment of the VR interaction apparatus 30 provided in the embodiments of this disclosure, the VR kit includes a head display device.

The control module 320 is specifically configured to control the head display device to trigger vibration feedback in response to head contact triggered by the first virtual object for the second virtual object.

In one embodiment, based on the foregoing embodiment corresponding to FIG. 30, in another embodiment of the VR interaction apparatus 30 provided in the embodiments of this disclosure, the control module 320 is specifically configured to respond to a head accessory wearing operation triggered by the first virtual object for the second virtual object;

respond to a head accessory removal operation triggered by the first virtual object for the second virtual object;

respond to a touch operation triggered by the first virtual object on a face of the second virtual object; or respond to a touch operation triggered by the first virtual object on a neck of the second virtual object.

In one embodiment, based on the foregoing embodiment corresponding to FIG. 30, in another embodiment of the VR interaction apparatus 30 provided in the embodiments of this disclosure, the control module 320 is specifically configured to obtain movement amplitude information corresponding to the head contact, the movement amplitude information being configured for describing movement amplitude magnitude of the head contact;

determine vibration strength information based on the movement amplitude information, the vibration strength information being positively correlated with the movement amplitude information; and control the head display device to trigger vibration feedback based on the vibration strength information.

In one embodiment, based on the foregoing embodiment corresponding to FIG. 30, in another embodiment of the VR interaction apparatus 30 provided in the embodiments of this disclosure, the VR kit includes a ring device.

The control module 320 is specifically configured to control the ring device to trigger vibration feedback in response to hand contact triggered by the first virtual object for the second virtual object.

In one embodiment, based on the foregoing embodiment corresponding to FIG. 30, in another embodiment of the VR interaction apparatus 30 provided in the embodiments of this disclosure, the control module 320 is specifically configured to respond to a handshake operation triggered by the first virtual object for the second virtual object;

respond to a high-five operation triggered by the first virtual object for the second virtual object; or respond to a hand touch operation triggered by the first virtual object for the second virtual object.

In one embodiment, based on the foregoing embodiment corresponding to FIG. 30, in another embodiment of the VR interaction apparatus 30 provided in the embodiments of this disclosure, the control module 320 is specifically configured to obtain movement amplitude information corresponding to the hand contact, the movement amplitude information being configured for describing movement amplitude magnitude of the hand contact;

determine vibration strength information based on the movement amplitude information, the vibration strength information being positively correlated with the movement amplitude information; and control the ring device to trigger vibration feedback based on the vibration strength information.

In one embodiment, based on the foregoing embodiment corresponding to FIG. 30, in another embodiment of the VR interaction apparatus 30 provided in the embodiments of this disclosure, the VR kit includes a glove device.

The control module 320 is specifically configured to: when the first virtual object transfers a first article to the second virtual object, control the glove device to trigger heat generation feedback in response to a contact operation on the first article.

In one embodiment, based on the foregoing embodiment corresponding to FIG. 30, in another embodiment of the VR interaction apparatus 30 provided in the embodiments of this disclosure, the VR kit includes a glove device.

The control module 320 is specifically configured to control the glove device to trigger temperature reduction feedback in response to a contact operation on a second article when the first virtual object transfers the second article to the second virtual object.

In one embodiment, based on the foregoing embodiment corresponding to FIG. 30, in another embodiment of the VR interaction apparatus 30 provided in the embodiments of this disclosure, the VR kit includes a head display device.

The control module 320 is specifically configured to control the head display device to trigger airflow feedback in response to a whispering operation triggered by the first virtual object for the second virtual object.

In one embodiment, based on the foregoing embodiment corresponding to FIG. 30, in another embodiment of the VR interaction apparatus 30 provided in the embodiments of this disclosure, the VR kit includes a belt device.

The control module 320 is specifically configured to control the belt device to trigger contraction feedback in response to a hug operation triggered by the first virtual object for the second virtual object.

In one embodiment, based on the foregoing embodiment corresponding to FIG. 30, in another embodiment of the VR interaction apparatus 30 provided in the embodiments of this disclosure, the VR kit includes a shoe device.

The control module 320 is specifically configured to respond to a ball passing operation triggered by the first virtual object to the second virtual object; and control the shoe device to trigger vibration feedback when a target ball comes into contact with a lower body of the second virtual object.

Figure 31:
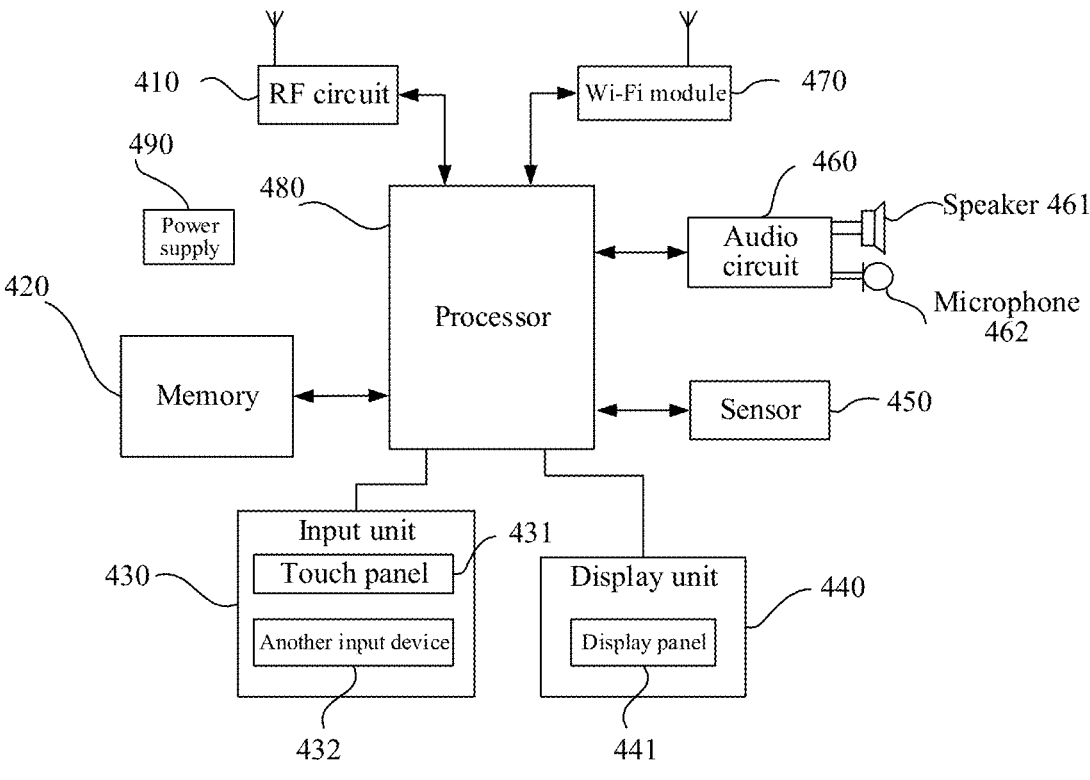
FIG. 31 is a schematic structural diagram of a VR device according to an embodiment of this disclosure.

An embodiment of this disclosure further provides a terminal device. As shown in FIG. 31, for case of description, only parts related to the embodiments of this disclosure is shown. For specific technical details that are not disclosed, refer to the method part of the embodiments of this disclosure. In this embodiment of this disclosure, an example in which the terminal device is a VR device is used for description.

FIG. 31 is a block diagram of a partial structure of a VR device related to a terminal device according to an embodiment of this disclosure. Referring to FIG. 31, the VR device includes: components such as: a radio frequency (RF) circuit 410, a memory 420 (e.g., a non-transitory computer-readable storage medium), an input unit 430 (including a touch panel 431 and another input device 432), a display unit 440 (including a display panel 441), a sensor 450, an audio circuit 460 (connected to a speaker 461 and a microphone 462), Wi-Fi module 470, a processor 480 (e.g., processing circuitry), and a power supply 490. A person skilled in the art may understand that the structure of the VR device shown in FIG. 31 does not constitute a limitation to the VR device, and the VR device may include more or fewer components than those shown in the figure, or some components may be combined, or a different component deployment may be used.

The memory 420 may be configured to store a software program and a module. The processor 480 runs the software program and the module that are stored in the memory 420, to perform various function applications of the VR device and data processing. The memory 420 may mainly include a program storage area and a data storage area. The program storage area may store an operating system, an application required by at least one function (for example, a sound playing function and an image playing function), or the like. The data storage area may store data (for example, audio data and a phone book) created according to use of the VR device. In addition, the memory 420 may include a high speed random access memory, and may also include a non-volatile memory, such as at least one magnetic disk storage device, a flash memory device, or another volatile solid-state storage device.

The processor 480 is a control center of the VR device, and is connected to various parts of the VR device by using various interfaces and lines. The processor 480 performs various functions and data processing of the VR device by running or executing the software program and/or module stored in the memory 420 and invoking the data stored in the memory 420. In one embodiment, the processor 480 may include one or more processing units. In one embodiment, the processor 480 may integrate an application processor and a modem processor. The application processor mainly processes an operating system, a user interface, an application, and the like. The modem processor mainly processes wireless communication. The modem processor may alternatively not be integrated in the processor 480.

Although not shown in the figure, the VR device may further include a camera, a Bluetooth module, and the like, which are not further described herein.

The operations performed by the terminal device in the foregoing embodiment may be based on the structure of the terminal device shown in FIG. 31.

An embodiment of this disclosure further provides a computer-readable storage medium, such as a non-transitory computer-readable storage medium, having a computer program stored therein, the computer program, when executed by a processor, implementing the operations of the methods described in the foregoing embodiments.

An embodiment of this disclosure further provides a computer program product, including a computer program, the computer program, when executed by a processor, implementing the operations of the methods described in the foregoing embodiments.

One or more modules, submodules, and/or units of the apparatus can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

In the foregoing descriptions, the foregoing embodiments are merely used as examples for describing the technical solutions of this disclosure, and are not intended to limit this disclosure. Although this disclosure is described in detail with reference to the foregoing embodiments, a person of ordinary skill in the art is to understand that, modifications may still be made to the technical solutions described in the foregoing embodiments, or equivalent replacements may be made to some of the technical features; and these modifications or replacements do not make the essence of the corresponding technical solutions depart from the spirit and scope of the technical solutions of the embodiments of this disclosure.

What is claimed is:

1. A method for virtual reality (VR) interaction, comprising:

displaying a plurality of virtual objects in a VR environment, the plurality of virtual objects including at least a first virtual object controlled by a first user and a second virtual object controlled by a second user; and in response to an action initiated by the first virtual object towards the second virtual object in the VR environment:

identifying a type of the action performed by the first virtual object that is directed to the second virtual object;

selecting, from a plurality of VR devices of different device types worn by the second user, at least one target VR device worn at a body location corresponding to the identified action type; and triggering haptic feedback through the at least one target VR device based on the type of the action.

2. The method according to claim 1, wherein the plurality of VR devices includes a head-mounted display, a finger-worn device, and shoe device.

3. The method according to claim 2, wherein the action includes a message transmission action, the at least one target VR device includes the head-mounted display, and the triggering the haptic feedback comprises:

activating vibration feedback in the head-mounted display in response to at least one of:

a chat message transmitted from the first user to the second user, a non-contact interactive gesture performed by the first virtual object towards the second virtual object, an email transmitted by the first user to the second user as a recipient, an electronic file transferred from the first user to the second user, a team invitation transmitted from the first user to the second user, or a roll call notification directed from the first user to the second user.

4. The method according to claim 2, wherein the action includes upper body contact between the first virtual object and the second virtual object, the at least one target VR device comprises the head-mounted display and the finger-worn device; and the triggering the haptic feedback comprises:

activating vibration feedback in the head-mounted display and the finger-worn device.

5. The method according to claim 4, wherein the upper body contact comprises at least one of:

contact with a shoulder area of the second virtual object, contact with an arm area of the second virtual object, contact with a back area of the second virtual object, or contact with a waist area of the second virtual object.

6. The method according to claim 4, wherein the activating the vibration feedback comprises:

determining a movement amplitude based on the upper body contact;

calculating a vibration intensity based on the movement amplitude, the vibration intensity being proportional to the movement amplitude; and activating the vibration feedback in the head-mounted display and the finger-worn device based on the calculated vibration intensity.

7. The method according to claim 6, wherein the movement amplitude corresponds to a hand movement speed of the action performed by the first user; and the calculating the vibration intensity comprises:

calculating the vibration intensity to be a first vibration intensity based on the movement amplitude being in a first movement amplitude range;

calculating the vibration intensity to be a second vibration intensity based on the movement amplitude being in a second movement amplitude range; and calculating the vibration intensity to be a third vibration intensity based on the movement amplitude being in a third movement amplitude range.

8. The method according to claim 2, wherein the action includes head contact between the first virtual object and the second virtual object, the at least one target VR device includes the head-mounted display, and the triggering the haptic feedback comprises:

activating vibration feedback in the head-mounted display.

9. The method according to claim 8, wherein the head contact comprises at least one of:

an action of the first virtual object placing a head accessory on the second virtual object, an action of the first virtual object removing a head accessory from the second virtual object, contact with a face area of the second virtual object, or contact with a neck area of the second virtual object.

10. The method according to claim 8, wherein the activating the vibration feedback comprises:

determining a movement amplitude based on the head contact;

calculating a vibration intensity based on the movement amplitude, the vibration intensity being proportional to the movement amplitude; and activating the vibration feedback in the head-mounted display based on the calculated vibration intensity.

11. The method according to claim 2, wherein the action includes hand contact between the first virtual object and the second virtual object, the at least one target VR device includes the finger-worn device, and the triggering the haptic feedback comprises:

activating vibration feedback in the finger-worn device.

12. The method according to claim 11, wherein the hand contact comprises at least one of:

a handshake between the first virtual object and the second virtual object, a high-five between the first virtual object and the second virtual object, or the first virtual object touching a hand of the second virtual object.

13. The method according to claim 11, wherein the activating the vibration feedback comprises:

determining a movement amplitude based on the hand contact;

calculating a vibration intensity based on the movement amplitude, the vibration intensity being proportional to the movement amplitude; and activating the vibration feedback in the finger-worn device based on the calculated vibration intensity.

14. The method according to claim 2, wherein the action includes the first virtual object transferring a warm object to the second virtual object, the at least one target VR device includes a glove device; and the triggering the haptic feedback comprises:

activating heat generation feedback in the glove device when the warm object contacts the second virtual object.

15. The method according to claim 2, wherein the action includes the first virtual object transferring a cold object to the second virtual object, the at least one target VR device includes a glove device; and the triggering the haptic feedback comprises:

activating cooling feedback in the glove device when the cold object contacts the second virtual object.

16. The method according to claim 2, wherein the action includes a whispering action performed by the first virtual object towards the second virtual object, the at least one target VR device includes the head-mounted display; and the triggering the haptic feedback comprises:

activating airflow in the head-mounted display.

17. The method according to claim 2, wherein the action includes a hugging action performed by the first virtual object towards the second virtual object, the at least one target VR device includes a belt device; and the triggering the haptic feedback comprises:

activating constriction feedback in the belt device.

18. The method according to claim 2, wherein the action includes a ball passing action from the first virtual object to the second virtual object, the at least one target VR device includes the shoe device; and the triggering the haptic feedback comprises:

activating vibration feedback in the shoe device when the passed ball contacts a lower body portion of the second virtual object.

19. A virtual reality (VR) interaction apparatus, comprising:

processing circuitry configured to:

display a plurality of virtual objects in a VR environment, the plurality of virtual objects including at least a first virtual object controlled by a first user and a second virtual object controlled by a second user; and in response to an action initiated by the first virtual object towards the second virtual object in the VR environment:

identify a type of the action performed by the first virtual object that is directed to the second virtual object;

select, from a plurality of VR devices of different device types worn by the second user, at least one target VR device worn at a body location corresponding to the identified action type; and trigger haptic feedback through the at least one target VR device based on the type of the action.

20. A non-transitory computer-readable storage medium, storing instructions which when executed by a processor cause the processor to perform:

displaying a plurality of virtual objects in a VR environment, the plurality of virtual objects including at least a first virtual object controlled by a first user and a second virtual object controlled by a second user; and in response to an action initiated by the first virtual object towards the second virtual object in the VR environment;

identifying a type of the action performed by the first virtual object that is directed to the second virtual object;

selecting, from a plurality of VR devices of different device types worn by the second user, at least one target VR device worn at a body location corresponding to the identified action type; and triggering haptic feedback through the at least one target VR device based on the type of the action.

* * * * *